(12) United States Patent
Hasegawa et al.

(10) Patent No.: US 7,952,250 B2
(45) Date of Patent: May 31, 2011

(54) ROTARY ELECTRIC MACHINE WITH COIL MEMBER AND METHOD OF MANUFACTURING COIL MEMBER

(75) Inventors: Youichi Hasegawa, Kasugai (JP); Tomoya Imanishi, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/659,575

(22) Filed: Mar. 12, 2010

(65) Prior Publication Data

US 2010/0187936 A1   Jul. 29, 2010

Related U.S. Application Data

(62) Division of application No. 11/896,893, filed on Sep. 6, 2007, now Pat. No. 7,804,217.

(30) Foreign Application Priority Data

| Jan. 31, 2007 | (JP) | 2007-021462 |
| Jan. 31, 2007 | (JP) | 2007-021741 |
| Feb. 7, 2007 | (JP) | 2007-028067 |
| Feb. 9, 2007 | (JP) | 2007-029979 |

(51) Int. Cl.
*H02K 1/00* (2006.01)
(52) U.S. Cl. .................. 310/179; 310/201
(58) Field of Classification Search .......... 310/184, 310/201, 206, 208, 179
See application file for complete search history.

(56) References Cited

U.S. PATENT DOCUMENTS

| 1,451,374 A * | 4/1923 | Rogers .................. 140/92.2 |
| 4,131,988 A | 1/1979 | Finegold |
| 4,312,387 A | 1/1982 | Finegold |
| 4,446,393 A | 5/1984 | Finegold |
| 7,249,965 B2 | 7/2007 | Hasegawa et al. |
| 2002/0043882 A1 | 4/2002 | Tanaka et al. |
| 2007/0063597 A1* | 3/2007 | Nito ........................... 310/68 C |
| 2009/0267441 A1* | 10/2009 | Hiramatsu et al. ............ 310/208 |

FOREIGN PATENT DOCUMENTS

| GB | 1 369 022 | 10/1974 |
| JP | A-53-55703 | 5/1978 |
| JP | B1-55-7061 | 2/1980 |

(Continued)

OTHER PUBLICATIONS

Chinese Office Action for Chinese Application No. 2007101488879, dated Feb. 5, 2010 with English Translation.

(Continued)

*Primary Examiner* — Nguyen N Hanh
(74) *Attorney, Agent, or Firm* — Oliff & Berridge, PLC

(57) ABSTRACT

In a rotary electric machine, a field coil member includes a first edgewise coil composed of a plurality of coaxially layered convolutions. The coaxially layered convolutions are wound around the outer periphery of the first pole core. The field coil member includes a second edgewise coil composed of a plurality of coaxially layered convolutions. The coaxially layered convolutions are wound around the outer periphery of the second pole core. The field coil member includes a link portion connecting between the first edgewise coil and the second edgewise coil in series. One of the first and second edgewise coils has one coil end extending therefrom to cross over the link portion at a crossover portion thereof. The crossover portion between the one coil end and the link portion is arranged to be non-overlapped with the convolutions of the one of the first and second edgewise coils.

2 Claims, 20 Drawing Sheets

FOREIGN PATENT DOCUMENTS

| | | |
|---|---|---|
| JP | UM-A-55-130557 | 9/1980 |
| JP | A-61-112540 | 5/1986 |
| JP | UM-A-63-182646 | 11/1988 |
| JP | UM-A-1-69373 | 5/1989 |
| JP | A-9-190779 | 7/1997 |
| JP | A-2001-178051 | 6/2001 |
| JP | A-2002-136019 | 5/2002 |
| JP | B2-3737461 | 11/2005 |
| JP | 2006-288123 | 10/2006 |
| JP | A-2006-271121 | 10/2006 |
| JP | A-2006-288017 | 10/2006 |

OTHER PUBLICATIONS

Jan. 25, 2011 Office Action issued in Japanese Patent Application No. 2007-028067 (with translation).

Jan. 25, 2011 Office Action issued in Japanese Patent Application No. 2007-029979 (with translation).

Feb. 22, 2011 Office Action issued in Japanese Patent Application No. 2007-021462 (with translation).

\* cited by examiner

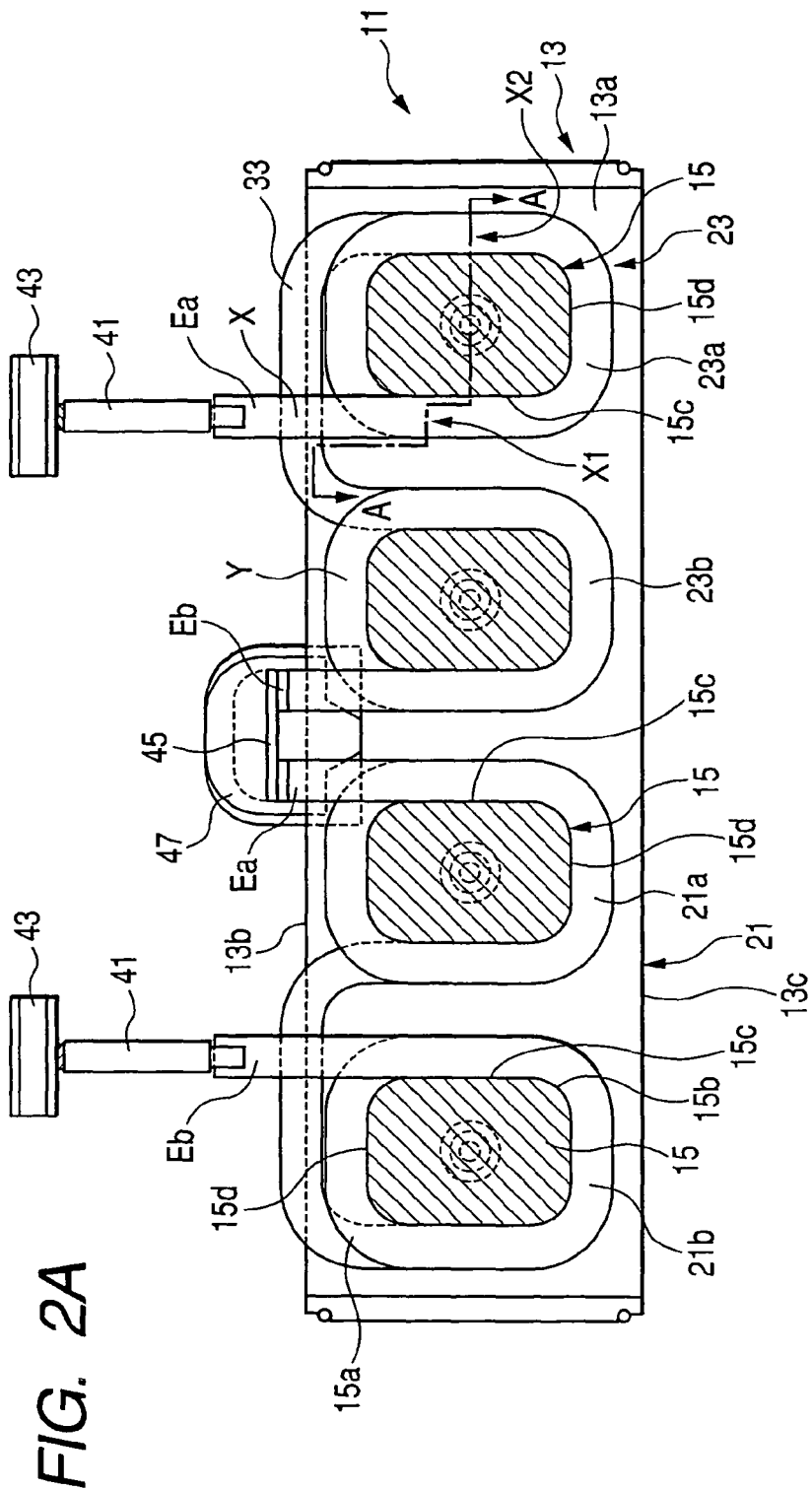
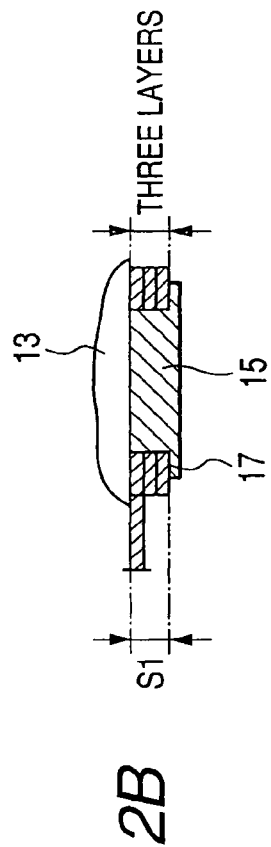
FIG. 2A
FIG. 2B

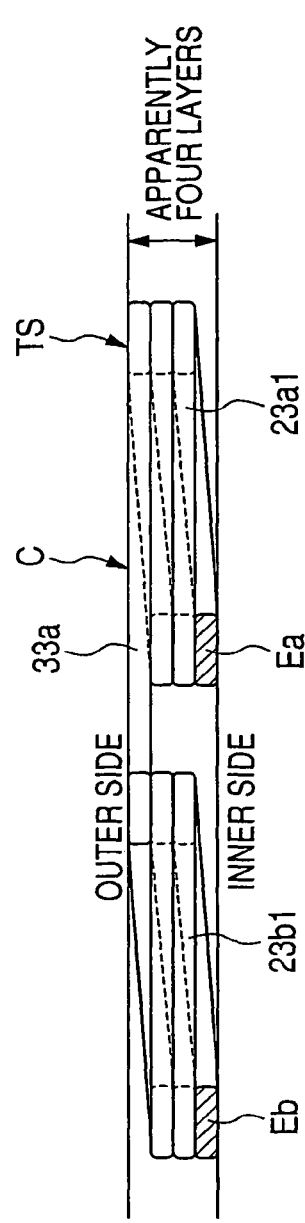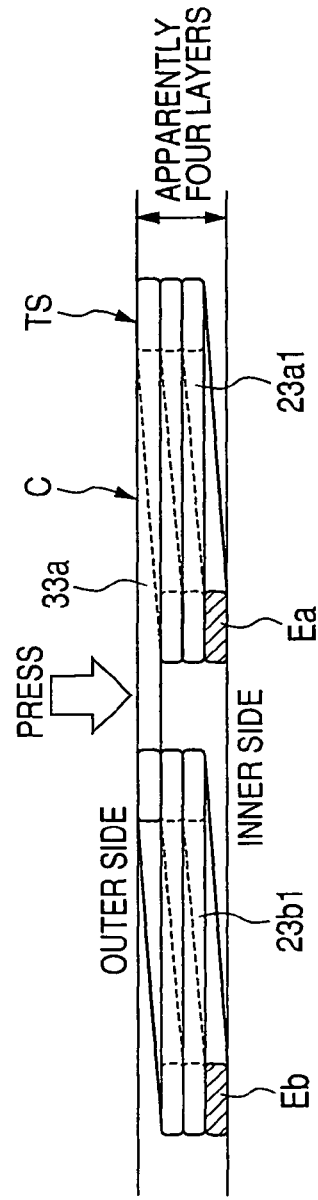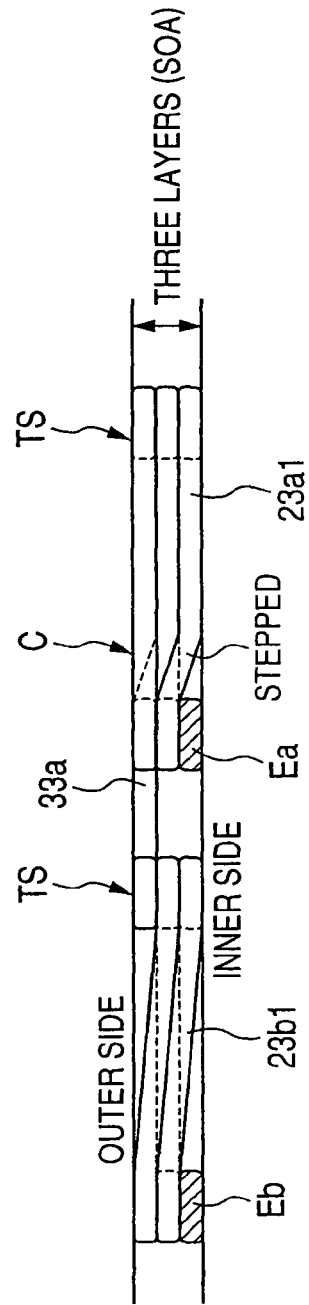

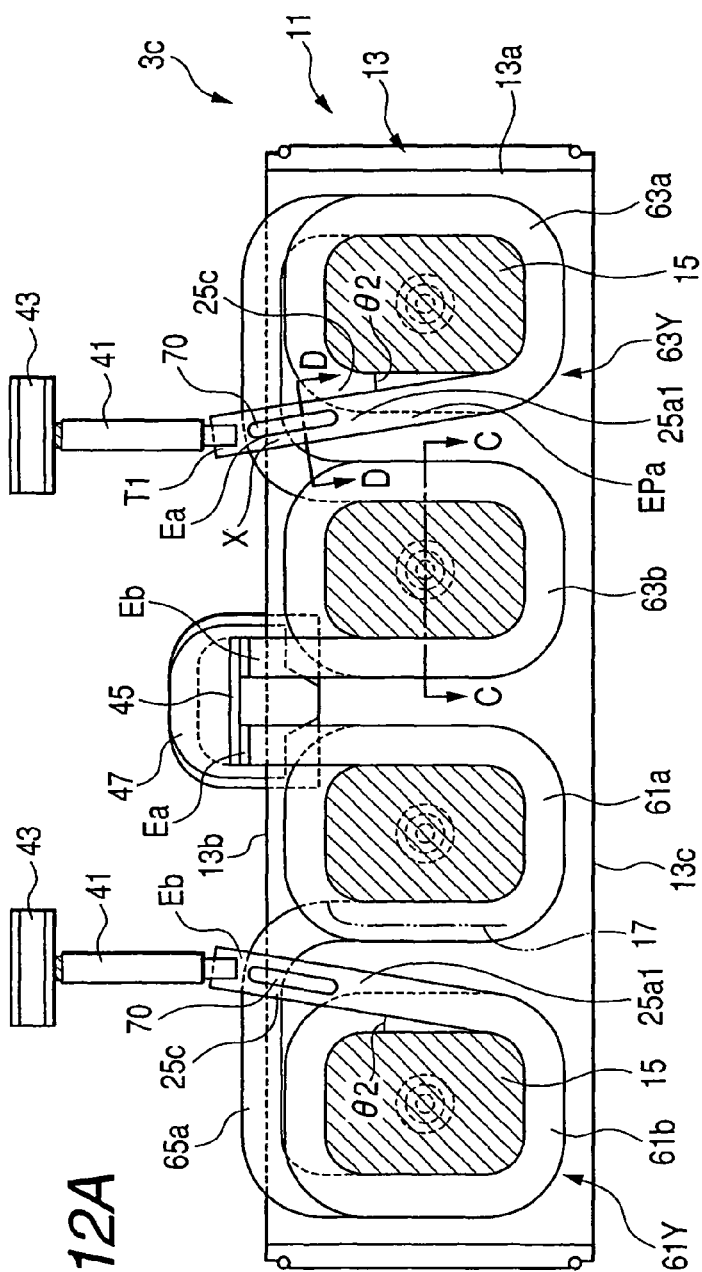
FIG. 12A
FIG. 12B
FIG. 12C

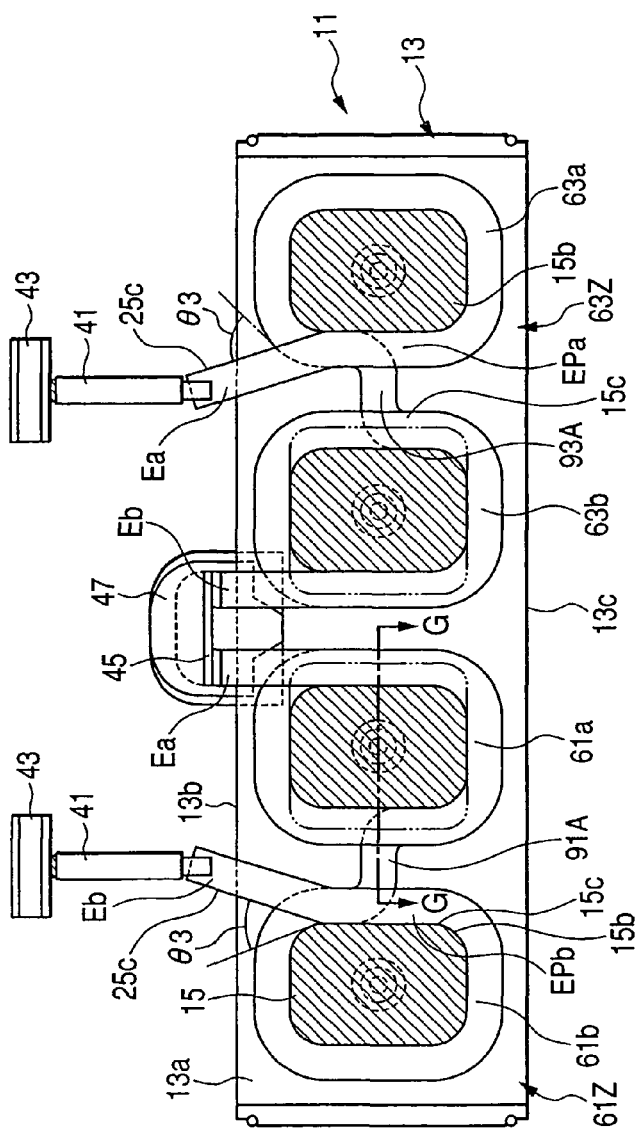
FIG. 17A
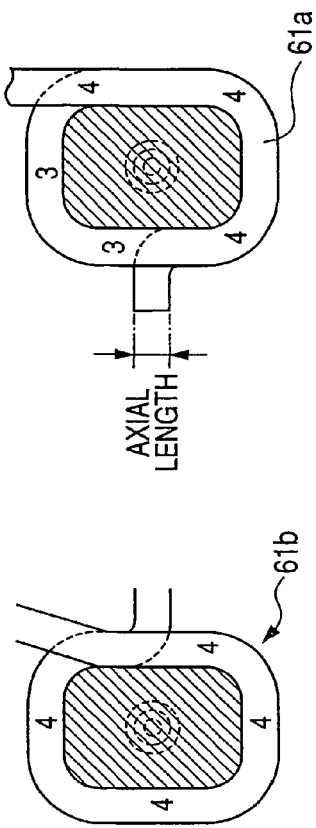
FIG. 17D
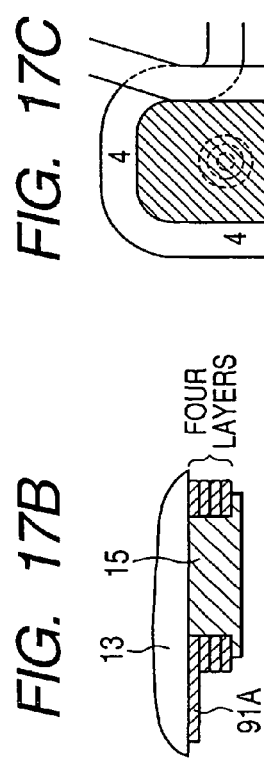
FIG. 17C
FIG. 17B

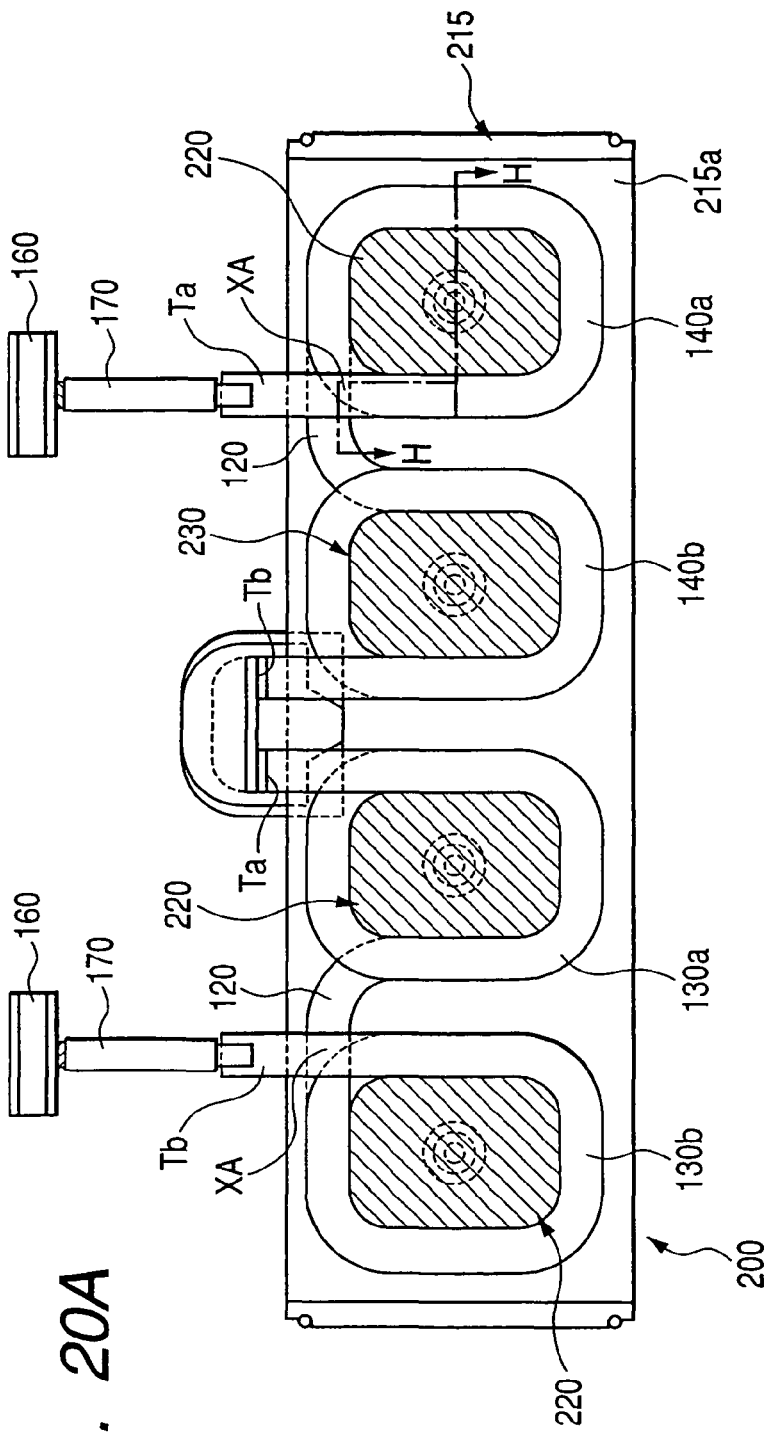
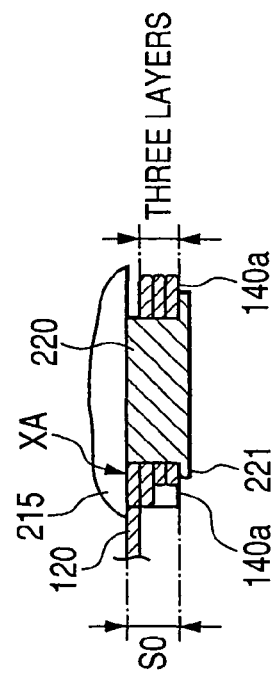
FIG. 20A
FIG. 20B

ROTARY ELECTRIC MACHINE WITH COIL MEMBER AND METHOD OF MANUFACTURING COIL MEMBER

CROSS REFERENCE TO RELATED APPLICATIONS

This is a Division of application Ser. No. 11/896,893 filed Sep. 6, 2007, now U.S. Pat. No. 7,804,217, which in turn is based on Japanese Patent Applications 2007-21741, 2007-21462, 2007-29979, and 2007-28067, filed on Jan. 31, 2007, Jan. 31, 2007, Feb. 9, 2007, and Feb. 7, 2007, respectively. This application claims the benefit of priority from each of the Japanese Patent Applications, so that the descriptions of which are all incorporated herein by reference. The disclosure of the prior application is hereby incorporated by reference herein in its entirety.

FIELD OF THE INVENTION

The present invention relates to rotary electric machines, such as generators and motors, having a rotor and a stator at least one of which is composed of a coil member; this coil member is formed with at least one edgewise coil member. The present invention also relates to methods of manufacturing such a coil member.

BACKGROUND OF THE INVENTION

U.S. Pat. No. 4,446,393 corresponding to Japanese Examined Patent Publication (kokoku) No. H04-049336 and Japanese Unexamined Patent Publication No. 2006-271121 disclose conventional field coils each formed by winding edgewise a rectangular wire strap.

An example of methods of manufacturing a pair of first and second field coil members to be used for producing a field coil assembly, which is disclosed in the US patent publication and/or JP Unexamined Patent Publications will be described hereinafter with reference to FIGS. 18A to 18F and 19A to 19F.

As illustrated in FIG. 18A, in order to produce the first field coil member, one continuous rectangular wire strap 100 with a predetermined length suitable to produce one filed coil member and a pair of first and second coil forms 110a and 110b are prepared.

Each of the first and second coil forms 110a and 110b has a round rectangular cylindrical shape. The rectangular wire strap 100 has a thickness substantially less than the width of its major sides 100a.

One minor side of one end portion of the wire strap 100 is so contacted onto the periphery of the first coil form 110a as to leave a predetermined lengthened end Ta thereof. The one minor side of the one end portion of the wire strap 100 is clamped by a clamp mechanism of the first coil form 110a.

Similarly, the other minor side of the other end of the wire strap 100 is so contacted onto the periphery of the second coil form 110b as to leave a predetermined lengthened end Tb thereof. The other minor side of the other end portion of the wire strap 100 is clamped by a clamp mechanism of the second coil form 110b.

Next, as illustrated in FIG. 18B, the first and second coil forms 110a and 110b are respectively rotated on their center axes at 180 degrees in a predetermined direction, such as counter-clockwise direction in FIG. 18B, while they come close to each other under the wire strap 100 being subjected to a tension.

This allows the one and the other end portions of the wire strap 100 to be wound edgewise on the peripheries of the first and second coil forms 110a and 110b.

Next, as illustrated in FIG. 18C, the first and second coil forms 110a and 110b are respectively rotated on their center axes at 90 degrees in the counter-clockwise direction such that each of the start ends Ta and Tb of the wire strap 100 crosses over one of the major sides 100a of the wire strap 100. This forms a first convolution (first layer) wound edgewise around a corresponding one of the peripheries of the first and second coil forms 110a and 110b.

Thereafter, a predetermined number of rotations of the coil forms 110a and 110b in the counter-clockwise direction are carried out.

Specifically, execution of the predetermined number of rotations of the coil forms 110a and 110b allows the wire strap 100 to be wound at their minor sides (at their edges) on the outer peripheries of the first and second coil forms 110a and 110b from the one and the other ends of the wire strap 100 toward the center thereof.

This forms successive convolutions of the wire strap 100 wound edgewise around the first and second coil forms 110a and 110b, respectively. The successive loops proceed from the remaining center of the wire strap 100 away therefrom along the axial directions of the first and second coil forms 110a and 110b (see FIGS. 18D and 28E).

After completion of the predetermined number of rotations of the coil forms 110a and 110b, a pair of spaced-apart coil elements coupled to each other with a link portion 120 is generated (see FIG. 18E).

The pair of coil elements is folded at the link portion 120 such that the spaced-apart coil elements approach each other and that the start ends Ta and Tb of the wire strap 100 are substantially parallel to each other (see FIG. 18F). Removal of the pair of coil elements from the first and second coil forms 110a and 110b provides a first field coil member 130 consisting of a pair of series-connected edgewise coils 130a and 130b.

The start end Ta of the series-connected edgewise coil 130a serves as a coil end thereof extending outwardly from one portion of the first convolution of the coil 130a in a direction orthogonal to the axial direction thereof. Similarly, the start end Tb of the series-connected edgewise coil 130b serves as a coil end thereof extending outwardly from a corresponding portion of the first convolution of the coil 130b in a direction orthogonal to the axial direction thereof.

In addition, as illustrated in FIG. 19A, in order to produce the second field coil member, the identical wire strap 100 and the identical first and second cylindrical coil forms 110a and 110b are prepared.

In the first different point of producing the second field coil member from the first field coil member, the other minor side of the one end portion of the wire strap 100 is so contacted onto the periphery of the first coil form 110a as to leave a start end Ta thereof. The other minor side of the one end portion of the wire strap 100 is clamped by the clamp mechanism of the first coil form 110a.

In addition, the one minor side of the other end of the wire strap 100 is so contacted onto the periphery of the second coil form 110b as to leave a start end Tb thereof. The one minor side of the other end portion of the wire strap 100 is clamped by the clamp mechanism of the second coil form 110b.

Next, in the second different point, as illustrated in FIG. 19B, the first and second coil forms 110a and 110b are respectively rotated on their center axes at 180 degrees in a predetermined direction opposite to the counter-clockwise direction, such as clockwise direction in FIG. 19B, while they come close to each other under the wire strap 100 being subjected to a tension.

In this way, like the first field coil member, the identical predetermined number of rotations of the coil forms 110a and 110b in the clockwise direction are carried out.

Specifically, execution of the identical predetermined number of rotations of the coil forms 110a and 110b allows the wire strap 100 to be wound at their minor sides (at their edges) on the outer peripheries of the first and second coil forms 110a and 110b from the one and the other ends of the wire strap 100 toward the center thereof.

This forms successive convolutions of the wire strap 100 wound edgewise around the first and second coil forms 110a and 110b, respectively. The successive loops proceed from the remaining center of the wire strap 100 away therefrom along the axial directions of the first and second coil forms 110a and 110b (see FIGS. 19C to 19E).

After completion of the predetermined number of rotations of the coil forms 110a and 110b, a pair of spaced-apart coil elements coupled to each other with a link portion 120 is generated (see FIG. 19E).

The pair of coil elements is folded at the link portion 120 such that the spaced-apart coil elements approach each other and that the start ends Ta and Tb of the wire strap 100 are substantially parallel to each other (see FIG. 19F).

Removal of the pair of coil elements from the first and second coil forms 110a and 110b provides a second field coil member 140 consisting of a pair of series-connected edgewise coils 140a and 140b.

The start end Ta of the series-connected edgewise coil 140a serves as a coil end thereof extending outwardly from one portion of the first convolution of the coil 140a in a direction orthogonal to the axial direction thereof. Similarly, the start end Tb of the series-connected edgewise coil 130b serves as a coil end thereof extending outwardly from a corresponding portion of the first convolution of the coil 130b in a direction orthogonal to the axial direction thereof.

As illustrated in FIGS. 18F and 19F, assuming that the first field coil member 130 and the second field coil member 140 are arranged across a line such that the coil 130a and the coil 140b are opposite to each other, the first field coil member 130 and the second field coil member 140 are symmetrical with respect to the line.

SUMMARY OF THE INVENTION

As an example of field coil assemblies for rotary electric machines, such as DC (Direct Current) motors, a field coil assembly 200 configured with the use of the pair of first and second field coil members 130 and 140 is illustrated in FIG. 20A.

Specifically, the field coil assembly 200 is composed of a yoke assembly 210.

The yoke assembly 210 consists of a yoke 215 having a substantially ring shape, and four pole cores 220.

The yoke 215 has an annular outer periphery and an annular inner periphery 215a opposing thereto.

The four pole cores 220 are mounted on the inner periphery 215a of the yoke 215 at substantially regular intervals. Note that FIG. 20A is a developed view of the inner side of the yoke 215 of the field coil assembly 200 in a circumferential direction thereof.

Each of the four pole cores 220 is configured to radially project from the inner periphery 215a of the yoke 215 so as to have a substantially round rectangular cylindrical shape. Each of the four pole cores 220 is formed at its projecting end with a flange 221 for supporting one of the first and second field coil members 130 and 140.

The first field coil member 130 is installed in any two of the four pole cores 220 circumferentially adjacent to each other, and the second field coil member 140 is installed in the remaining two of the four pole cores 220.

Specifically, the series-connected edgewise coil 130b of the first field coil member 130 is fitted from its last layer on the periphery of the left-side (circumferentially outside) one of the two pole cores 220 in FIG. 20A.

Simultaneously with the fitting of the coil 130b with the left-side one of the two pole cores 220, the series-connected edgewise coil 130a of the first field coil member 130 is fitted from its last layer on the periphery of the right-side (circumferentially inside) one of the two pole cores 220 in FIG. 20A.

Like the first field coil member 130, the series-connected edgewise coil 140b of the second field coil member 140 is fitted from its last layer on the periphery of the left-side (circumferentially inside) one of the remaining two pole cores 220 in FIG. 20A circumferentially adjacent to the coil 130a.

Simultaneously with the fitting of the coil 140b with the left-side one of the remaining two pole cores 220, the series-connected edgewise coil 140a is fitted from its last layer on the periphery of the right-side (circumferentially outside) of the remaining two pole cores 220 in FIG. 20A.

The coil end (start end) Ta of the coil 140a and the coil end (start end) Tb of the coil 130b are electrically connected to lead wires 170, respectively. The lead wires 170 are electrically connected to positive brushes 160, respectively.

The coil end Ta of the coil 130a and the coil end Tb of the coil 140b extend outwardly (upwardly) in the axial direction of the yoke 215, and they are electrically connected to a lead plate 230.

Specifically, when a DC current is supplied to each of the coils 130a and 140b through the lead plate 230, the DC current flowing through the coil 130a produces a magnetic flux in the axial direction of the coil 130a from the center of the yoke 215 toward the periphery thereof. Similarly, the DC current flowing through the coil 130b produces a magnetic flux in the axial direction of the coil 130b toward the center of the yoke 215.

The DC current flowing through the coil 140b produces a magnetic flux in the axial direction of the coil 140b toward the center of the yoke 215. Similarly, the DC current flowing through the coil 140a produces a magnetic flux in the axial direction of the coil 140a from the center of the yoke 215 toward the periphery thereof.

Specifically, when an armature with an armature winding wound therearound is rotatably installed in the yoke 215 opposing each of the pole cores 220 with a gap and an armature current is supplied to the winding, the produced alternative directed magnetic fluxes in the yoke 215 in the circumferential direction thereof allows the armature to rotate on its rotary shaft.

As illustrated in FIGS. 18 to 20, the coil 140a of the second field coil member 140 is formed by winding edgewise the wire strap 100 and fitting it on the periphery of the corresponding core 220 with the start end Ta being left for a terminal of the coil 140. This causes the start end Ta of the second field coil member 140 to extend outwardly from one portion of the first convolution of the coil 140a in the direction orthogonal to the axial direction thereof and parallel to the axial direction of the yoke 215.

The start end Ta extending outwardly from the edgewise coil member 140 fitted on the periphery of the corresponding core 220 has an influence on the number of layers (convolutions) of the coil 140*a* corresponding to the number of turns thereof at different portions thereof.

Specifically, because the start end Ta extending outwardly from the coil 140*a* is disposed to cross over the link portion 120 between the coils 140*a* and 140*b* and part of the layers of the coil 140*a*, the number of layers of the crossover potion XA of the start end Ta of the coil 140*a* is greater by one than that of layers of another portion of the coil 140*a*.

For example, it is assumed that the predetermined number of rotations of the coil forms 110*a* and 110*b* to produce each of the first and second field coil members 130 and 140 is set to two and half.

In this assumption, the number of layers of the crossover portion XA of the start end Ta of the coil 140*a* is 4 greater by 1 than that of layers of another portion of the coil 140*a* being 3 (see FIG. 18B).

Specifically, as illustrated in FIG. 20B, a space S0 for fitting therein the four layers of the coil 140*a* need be provided between the inner periphery 215*a* of the yoke 215 and the flange 221 of the corresponding pole core 220. However, because the number of layers of most potions of the coil 140*a* except for the crossover potion XA is 3, a gap of one layer appears in the space S0.

This may deteriorate a winding space factor representing a measure of the utilization of the space S0 by the convolutions of the coil 140*a*, causing the physical size of the rotary electric machine to increase.

The crossover portion XA of the coil 140*a* having four layers (convolutions) causes the difference in the number of turns between the coils 140*a* and 140*b*. For example, a portion Y of the coil 140*b* has two layers different from the crossover portion XA of the coil 140*a* by two layers.

Thus, when a DC current is supplied to flow through the series-connected edgewise coils 140*a* and 140*b*, the difference in the number of turns between the coils 140*a* and 140*b* may unbalance the magnetic fluxes to be produced respectively by the coils 140*a* and 140*b* based on the DC current. This is because a magnetic flux to be produced by a coil is commonly in proportion to the number of turns of the coil.

The unbalance in the magnetic fluxes to be produced respectively by the coils 140*a* and 140*b* may cause variations in the output torque of the rotary electric machine because the output torque is in proportion to the magnitude of the magnetic flux produced by each of the coils 140*a* and 140*b*. The unbalance also may deteriorate the commutation between the brushes and the armature winding 5*d*.

For the same reasons as the second field coil member 140 mentioned above, a gap of one layer appears in a space for fitting therein the four layers of the coil 130*b* provided between the inner periphery 215*a* of the yoke 215 and the flange 221 of the corresponding pole core 220. This may deteriorate a winding space factor representing a measure of the utilization of the space by the convolutions of the coil 130*b*.

In addition, the unbalance in the magnetic fluxes to be produced respectively by the coils 130*a* and 130*b* may cause variations in the output torque of the rotary electric machine because the output torque is in proportion to the magnitude of the magnetic flux produced by each of the coils 130*a* and 130*b*. The unbalance also may deteriorate the commutation between the brushes and the armature winding 5*d*.

The start end extending outwardly from each of the first and second field coil members 130 and 140, which is wound edgewise and fitted on the periphery of the corresponding core 220, has an influence on the number of layers (convolutions) of the coil 140*a* corresponding to the number of turns thereof at different portions thereof.

Specifically, when the start end Tb of the first field coil member 130 and the corresponding brush 160 are shifted in position in the circumferential direction of the yoke 215, the start end Tb of the first field coil member 130 need to be bent about an axis perpendicular to major sides thereof toward the corresponding brush 160. In other words, the start end Tb of the first field coil member 130 consisting of the rectangular wire strap 100 need to be bent edgewise toward the corresponding brush 160.

Similarly, when the start end Ta of the second field coil member 140 and the corresponding brush 160 are shifted in position in the circumferential direction of the yoke 215, the start end Ta of the second field coil member 140 consisting of the rectangular wire strap 100 need to be bent toward the corresponding brush 160.

However, the edgewise bending of the start end of the rectangular wire strap 100 requires major load. Thus, when the start end of the rectangular wire strap 100 already formed into a field coil member is bent edgewise, the field coil member may be deformed. In addition, when, as the rectangular wire strap 100, an insulating-film coated wire strap is used to form a field coil member, the edgewise bending of the start end of the insulating-film coated wire strap may cause the insulating-film of the insulating-film coated wire strap to be fallen off.

The deformation of at least one of the field coil members 130 and 140 may make difficult the fitting of the series-connected field edgewise coils of at least one of the field coil members 130 and 140 on the peripheries of the corresponding cores 220.

For these reasons, even though the start end of at least one of the field coil members 130 and 140 and the corresponding brush 160 are shifted in position in the circumferential direction of the yoke 215, electrical connection between the start end and the corresponding brush 160 can be established using an electrical connection member without using the edgewise bending. This however may increase parts count for the rotary electric machine, resulting the increase in the cost thereof.

Furthermore, the start end extending outwardly from each of the first and second field coil members 130 and 140, which is wound edgewise and fitted on the periphery of the corresponding core 220, has an influence on the a corresponding one of the lead wires 170 connected to a corresponding one of the brushes 160.

Specifically, the rectangular wire strap 100 has a substantially rectangular shape in its lateral cross section orthogonal to the length direction thereof, and has a thickness substantially less than the width of its major sides 100*a*. With the configuration of the wire strap 100, the section modulus of the wire strap 100 is in proportion to the square of its thickness and to its width.

For this reason, each of the edgewise coils has low rigidity against force to be applied in the thickness direction thereof orthogonal to the major sides 100*a*, whereas has high rigidity against force applied in the width direction thereof orthogonal to the minor sides.

When the field coil assembly 200 set forth above is applied to a starter motor, as an example of rotary electric machines, to be installed in one of various types of vehicles, large amount of vibration acceleration of the engine installed in the one of the various types of vehicles is applied to the starter motor.

For this reason, when the large amount of vibration acceleration of the engine is applied to the starter motor, the large amount of vibration acceleration is transferred to the field coil assembly 200.

At that time, the coil ends Ta and Tb of the first and second field coil members 130 and 140 of the field coil assembly 200 are electrically connected to the lead wires 170 electrically connected to the brushes 160, respectively. For this reason, the large amount of vibration acceleration is transferred to the coil ends Ta and Tb of the first and second field coil members 130 and 140.

Because each of the coil ends Ta and Tb of the first and second field coil members 130 and 140 has low rigidity against force applied in the thickness direction thereof set forth above, the large amount of vibration acceleration may transfer the lead wires 170 via the corresponding coil ends Ta and Tb. This may deteriorate the lead wires 170.

In addition, in order to increase output torque of a starter motor in which such an edgewise coil has been installed as much as that of another starter motor in which a common flatwise coil has been installed while the physical size of the edgewise coil is kept as it is, the ratio of the width to the thickness of the edgewise coil is required to increase.

This further reduces the rigidity of the edgewise coil against force applied in the thickness direction thereof, which may contribute deterioration of the lead wires 170 due to the large amount of vibration acceleration of the engine.

On the other hand, in some uses of such edgewise coils, they are required to allow their number of turns to be adjustable. However, specific means for adjusting the number of turns of such edgewise coils are not disclosed in the US patent publication and/or JP Unexamined Patent Publications set forth above.

Accordingly, an object of at least one aspect of the present invention is therefore to solve the problems set force above caused by at least one end of an edgewise coil member of a rotary electric machine extending outwardly therefrom; this edgewise coil member comprises a one-piece rectangular wire strap wound edgewise into at least one field coil.

In addition, an object of at least another aspect of the present invention is therefore to adjust the number of turns of an edgewise coil member; this edgewise control member comprises a one-piece rectangular wire strap wound edgewise into at least a pair of series-connected field coils.

According to one aspect of the present invention, there is provided a rotary electric machine for rotating an armature based on a magnetic field. The rotary electric machine includes a yoke having a circumferential surface and first and second pole cores mounted on the circumferential surface. Each of the first and second pole cores has an outer periphery. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes a first edgewise coil composed of a plurality of coaxially layered convolutions. The plurality of coaxially layered convolutions are wound around the outer periphery of the first pole core. The field coil member includes a second edgewise coil composed of a plurality of coaxially layered convolutions. The plurality of coaxially layered convolutions are wound around the outer periphery of the second pole core. The field coil member includes a link portion connecting between the first edgewise coil and the second edgewise coil in series. One of the first and second edgewise coils has one coil end extending therefrom to cross over the link portion at a crossover portion thereof. The crossover portion between the one coil end and the link portion is arranged to be non-overlapped with the plurality of convolutions of the one of the first and second edgewise coils.

According to another aspect of the present invention, there is provided a rotary electric machine for rotating an armature based on a magnetic field. The rotary electric machine includes a yoke having a circumferential surface and a pole core mounted on the circumferential surface. The pole core has an outer periphery. The outer periphery has at least one rounded corner. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes an edgewise coil composed of a plurality of coaxially layered convolutions. The plurality of coaxially layered convolutions are wound around the outer periphery of the pole core. The edgewise coil has one coil end. The one coil end of the edgewise coil extends from a start point on the at least one rounded corner of the pole core in a direction parallel to a tangential direction of the start point of the one rounded corner. The extending direction of the one coil end of the edgewise coil is tilted from an axial direction of the yoke.

According to a further aspect of the present invention, there is provided a rotary electric machine for rotating an armature based on a magnetic field. The rotary electric machine includes a yoke having a circumferential surface and first and second pole cores mounted on the circumferential surface. Each of the first and second pole cores has an outer periphery. The outer periphery has at least one rounded corner. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes a first edgewise coil composed of a plurality of coaxially layered convolutions. The plurality of coaxially layered convolutions of the first edgewise coil are wound around the outer periphery of the first pole core. The first edgewise coil has one and the other coil ends. The one coil end of the first edgewise coil extending from a start point on the at least one rounded corner of the first pole core in a direction parallel to a tangential direction of the start point of the one rounded corner. The extending direction of the one coil end of the first edgewise coil is tilted from an axial direction of the yoke. The field coil member includes a second edgewise coil composed of a plurality of coaxially layered convolutions. The plurality of coaxially layered convolutions of the second edgewise coil are wound around the outer periphery of the second pole core. The second edgewise coil has one and the other coil ends. The one coil end of the second edgewise coil extends from a start point on the at least one rounded corner of the second pole core in a direction parallel to a tangential direction of the start point of the one rounded corner. The extending direction of the one coil end of the second edgewise coil is tilted from the axial direction of the yoke, the other coil end of the second edgewise coil being electrically connected to the other coil end of the first edgewise coil in series.

According to a still further aspect of the present invention, there is provided a rotary electric machine for rotating an armature based on a magnetic field. The rotary electric machine includes a yoke having a circumferential surface and a pole core mounted on the circumferential surface, the pole core having an outer periphery. The rotary electric machine includes a field coil member working to produce a magnetic field when energized. The field coil member is composed of a rectangular wire strap, the rectangular wire strap having a pair of opposing major sides and a thickness therebetween substantially less than a width of the major sides. The rectangular wire strap is wound edgewise into the field coil member. The field coil includes an edgewise coil composed of a plurality of coaxially layered convolutions. The plurality of coaxially layered convolutions are wound around the outer periphery of the pole core. The edgewise coil has one coil end to be electrically connected to a lead wire of a brush for providing electrical contact with the armature. The one coil end of the edgewise coil extends therefrom. The field coil includes a reinforcement formed on one of the major sides of the one coil end of the edgewise coil and working to reinforce rigidity against force to be applied in the thickness direction of the one coil end.

According to a still further aspect of the present invention, there is provided a rotary electric machine for rotating an armature based on a magnetic field. The rotary electric machine includes a yoke having a circumferential surface and a pole core mounted on the circumferential surface, the pole core having an outer periphery. The rotary electric machine includes an electrically insulating bobbin having an annular peripheral portion fitted on the outer periphery of the pole core. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes an edgewise coil composed of a plurality of coaxially layered convolutions. The plurality of coaxially layered convolutions are wound around the annular peripheral portion of the electrically insulating bobbin. The edgewise coil has one coil end to be electrically connected to a lead wire of a brush for providing electrical contact with the armature. The one coil end of the edgewise coil extends therefrom. The field coil includes a fastening member integrally provided in the electrically insulating bobbin and configured to fasten the one coil end of the edgewise coil.

According to a still further aspect of the present invention, there is provided a rotary electric machine for rotating an armature based on a magnetic field. The rotary electric machine includes a yoke having a circumferential surface and first and second pole cores mounted on the circumferential surface. Each of the first and second pole cores has an outer periphery. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes a first edgewise coil composed of a plurality of coaxially layered convolutions. The plurality of coaxially layered convolutions are wound around the outer periphery of the first pole core. The field coil member includes a second edgewise coil composed of a plurality of coaxially layered convolutions. The plurality of coaxially layered convolutions are wound around the outer periphery of the second pole core. The field coil member includes a link portion continuing between one convolution of the plurality of coaxially layered convolutions of the first edgewise coil and one convolution of the plurality of coaxially layered convolutions of the second edgewise coil. A position of the link portion in a circumferential direction of the yoke is determined depending on at least one of the number of coaxially layered convolutions of the first edgewise coil and the number of coaxially layered convolutions of the first edgewise coil.

According to a still further aspect of the present invention, there is provided a rotary electric machine for rotating an armature based on a magnetic field. The rotary electric machine includes a yoke having a circumferential surface and first and second pole cores mounted on the circumferential surface. Each of the first and second pole cores has an outer periphery. The rotary electric machine includes a field coil member working to produce a magnetic field when energized. The field coil member is composed of a rectangular wire strap. The rectangular wire strap has a pair of opposing major sides and a thickness therebetween substantially less than a width of the major sides. The rectangular wire strap is wound edgewise into the field coil member. The field coil member includes a first edgewise coil composed of a plurality of coaxially layered convolutions. The plurality of coaxially layered convolutions are wound around the outer periphery of the first pole core. The field coil member includes a second edgewise coil composed of a plurality of coaxially layered convolutions. The plurality of coaxially layered convolutions are wound around the outer periphery of the second pole core. The field coil member includes a link portion so arranged in an axial direction of the yoke as to continue between one convolution of the plurality of coaxially layered convolutions of the first edgewise coil and one convolution of the plurality of coaxially layered convolutions of the second edgewise coil. A length of the link portion in the axial direction of the yoke is determined depending on at least one of the number of coaxially layered convolutions of the first edgewise coil and the number of coaxially layered convolutions of the second edgewise coil.

According to a still further aspect of the present invention, there is provided a method of manufacturing a field coil member to be mounted on a circumferential surface of a yoke. The method includes providing a rectangular wire strap. The rectangular wire strap has a pair of opposing major sides and a thickness therebetween substantially less than a width of the major sides. The method includes winding edgewise the rectangular wire strap from both one and the other ends thereof to form:
  a first edgewise coil composed of a plurality of coaxially layered convolutions on the one end of the rectangular wire strap;
  a second edgewise coil composed of a plurality of coaxially layered convolutions on the other end of the rectangular wire strap; and
  a link portion disposed on the remaining portion of the rectangular wire strap between the first and second edgewise coils, one of the first and second edgewise coils having one coil end extending therefrom to cross over the link portion at a crossover portion thereof. The method includes arranging the crossover portion between the one coil end and the link portion such that the crossover portion is non-overlapped with the plurality of coaxially layered convolutions of the one of the first and second edgewise coils.

According to a still further aspect of the present invention, there is provided a method of manufacturing a field coil member having an edgewise coil to be fitted on a pole core mounted on a circumferential surface of a yoke. The pole core has an outer periphery. The outer periphery has at least one rounded corner. The method includes providing a rectangular wire strap, the rectangular wire strap having a pair of opposing major sides and a thickness therebetween substantially less than a width of the major sides. The method includes providing a coil form. The coil form has an outer periphery identical in shape to the outer periphery of the pole core. The method includes bring one minor surface of one end of the rectangular wire strap in contact with the at least one rounded corner of the outer periphery of the coil form so that:

a tip of the one end of the rectangular wire strap is left thereon; and a predetermined angle is formed between a longitudinal direction of the rectangular wire strap and a portion of the outer periphery of the coil form opposing the rectangular wire strap. The method includes winding edgewise the rectangular wire strap from the one end thereof around the outer periphery of the coil form while a state of the one minor surface of the one end of the rectangular wire strap being in contact with the at least one rounded corner of the outer periphery of the coil form is maintained to thereby form the edgewise coil composed of a plurality of coaxially layered convolutions. The tip of the rectangular wire strap serves as a coil end of the edgewise coil. The method includes fitting the edgewise coil on the outer periphery of the pole core of the yoke so that the coil end of the edgewise coil extends from a start point on the at least one rounded corner of the pole core in a direction parallel to a tangential direction of the start point of the at least one rounded corner. The extending direction of the coil end of the edgewise coil is tilted from an axial direction of the yoke at the predetermined angle.

According to a still further aspect of the present invention, there is provided a method of manufacturing a field coil member having first and second edgewise coils to be respectively fitted on first and second pole cores mounted on a circumferential surface of a yoke. Each of the first and second pole cores has an outer periphery. The outer periphery has at least one rounded corner. The method includes providing a rectangular wire strap. The rectangular wire strap has a pair of opposing major sides and a thickness therebetween substantially less than a width of the major sides. The method includes providing first and second coil forms, the first coil form having an outer periphery identical in shape to the outer periphery of the first pole core. The second coil form has an outer periphery identical in shape to the outer periphery of the second pole core. The method includes bring one minor surface of one end of the rectangular wire strap in contact with the at least one rounded corner of the outer periphery of the first coil form and one minor surface of the other end of the rectangular wire strap in contact with the at least one rounded corner of the outer periphery of the second coil form so that:

a tip of the one end of the rectangular wire strap is left thereon;

a predetermined first angle is formed between a longitudinal direction of the rectangular wire strap and a portion of the outer periphery of the first coil form opposing the rectangular wire strap;

a tip of the other end of the rectangular wire strap is left thereon;

a predetermined second angle is formed between a longitudinal direction of the rectangular wire strap and a portion of the outer periphery of the second coil form opposing the rectangular wire strap. The method includes winding edgewise the rectangular wire strap from the one and the other ends thereof around the outer peripheries of the first and second coil forms while a state of the one minor surface of the one end of the rectangular wire strap being in contact with the at least one rounded corner of the outer periphery of the first coil form and that of the one minor surface of the other end of the rectangular wire strap being in contact with the at least one rounded corner of the outer periphery of the second coil form are maintained to thereby form the first and second edgewise coils each composed of a plurality of coaxially layered convolutions. The tip of the one end of the rectangular wire strap serves as a first coil end of the first edgewise coil. The tip of the other end of the rectangular wire strap serves as a second coil end of the second edgewise coil. The method includes fitting the first edgewise coil on the outer periphery of the first pole core of the yoke so that the first coil end of the first edgewise coil extends from a start point on the at least one rounded corner of the first pole core in a direction parallel to a tangential direction of the start point of the at least one rounded corner, the extending direction of the first coil end of the first edgewise coil being tilted from an axial direction of the yoke at the predetermined first angle. The method includes fitting the second edgewise coil on the outer periphery of the second pole core of the yoke so that the second coil end of the second edgewise coil extends from a start point on the at least one rounded corner of the second pole core in a direction parallel to a tangential direction of the start point of the at least one rounded corner, the extending direction of the second coil end of the second edgewise coil being tilted from an axial direction of the yoke at the predetermined second angle.

According to a still further aspect of the present invention, there is provided a method of manufacturing a field coil member to be mounted on a circumferential surface of a yoke. The method includes providing a rectangular wire strap. The rectangular wire strap has a pair of opposing major sides and a thickness therebetween substantially less than a width of the major sides. The method includes winding edgewise the rectangular wire strap from both one and the other ends thereof to form:

a first edgewise coil composed of a plurality of coaxially layered convolutions on the one end of the rectangular wire strap;

a second edgewise coil composed of a plurality of coaxially layered convolutions on the other end of the rectangular wire strap; and a link portion continuing between one convolution of the plurality of coaxially layered convolutions of the first edgewise coil and one convolution of the plurality of coaxially layered convolutions of the second edgewise coil. The method includes adjusting a circumferential position of the link portion depending on at least one of the number of coaxially layered convolutions of the first edgewise coil and the number of coaxially layered convolutions of the first edgewise coil.

According to a still further aspect of the present invention, there is provided a method of manufacturing a field coil member to be mounted on a circumferential surface of a yoke. The method includes providing a rectangular wire strap. The rectangular wire strap has a pair of opposing major sides and a thickness therebetween substantially less than a width of the major sides. The method includes winding edgewise the rectangular wire strap from both one and the other ends thereof to form:

a first edgewise coil composed of a plurality of coaxially layered convolutions on the one end of the rectangular wire strap;

a second edgewise coil composed of a plurality of coaxially layered convolutions on the other end of the rectangular wire strap; and a link portion continuing between one convolution of the plurality of coaxially layered convolutions of the first edgewise coil and one convolution of the plurality of coaxially layered convolutions of the second edgewise coil. The method includes adjusting a length of the link portion in the axial direction of the yoke depending on at least one of the number of coaxially layered convolutions of the first edgewise coil and the number of coaxially layered convolutions of the first edgewise coil.

BRIEF DESCRIPTION OF THE DRAWINGS

Other objects and aspects of the invention will become apparent from the following description of embodiments with reference to the accompanying drawings in which:

FIG. 2A is a partially cross-sectional circumferential developed view of the inner periphery of a yoke of a yoke assembly of a field coil assembly of the starter motor in a circumferential direction thereof according to the first embodiment;

FIG. 2B is a cross sectional view of the field coil assembly take on line A-A of FIG. 2A;

FIGS. 8A to 8C are views substantially illustrating a process of pressing a second field coil member inwardly before the second field coil member is pressed to form a curved shape allowed to be arranged along the inner periphery of a yoke according to the second embodiment;

FIG. 12A is a partially cross-sectional circumferential developed view of the inner periphery of a yoke of a yoke assembly of a field coil assembly of a starter motor in a circumferential direction thereof according to a fourth embodiment of the present invention;

FIG. 12B is a cross sectional view of the field coil assembly take on line C-C of FIG. 12A;

FIG. 12C is an enlarged cross sectional view of the field coil assembly take on line D-D of FIG. 12A;

FIG. 17A is a partially sectional circumferential developed view of part of the inner periphery of a yoke of a field coil assembly according to a modification of the seventh embodiment;

FIG. 17B is a cross sectional view of the field coil assembly take on line G-G of FIG. 17A;

FIG. 17C is a view schematically illustrating the number of turns of a coil of a first field coil member electrically connected to a lead wire illustrated in FIG. 17A;

FIG. 17D is a view schematically illustrating the number of turns of a coil of the first field coil member electrically connected to a lead plate illustrated in FIG. 17A;

FIG. 20A is a partially cross-sectional circumferential developed view of the inner periphery of a yoke of a yoke assembly of a conventional field coil assembly of a starter motor in a circumferential direction thereof; and FIG. 20B is a cross sectional view of the field coil assembly take on line H-H of FIG. 20A.

DETAILED DESCRIPTION OF EMBODIMENTS OF THE INVENTION

Figure 1:
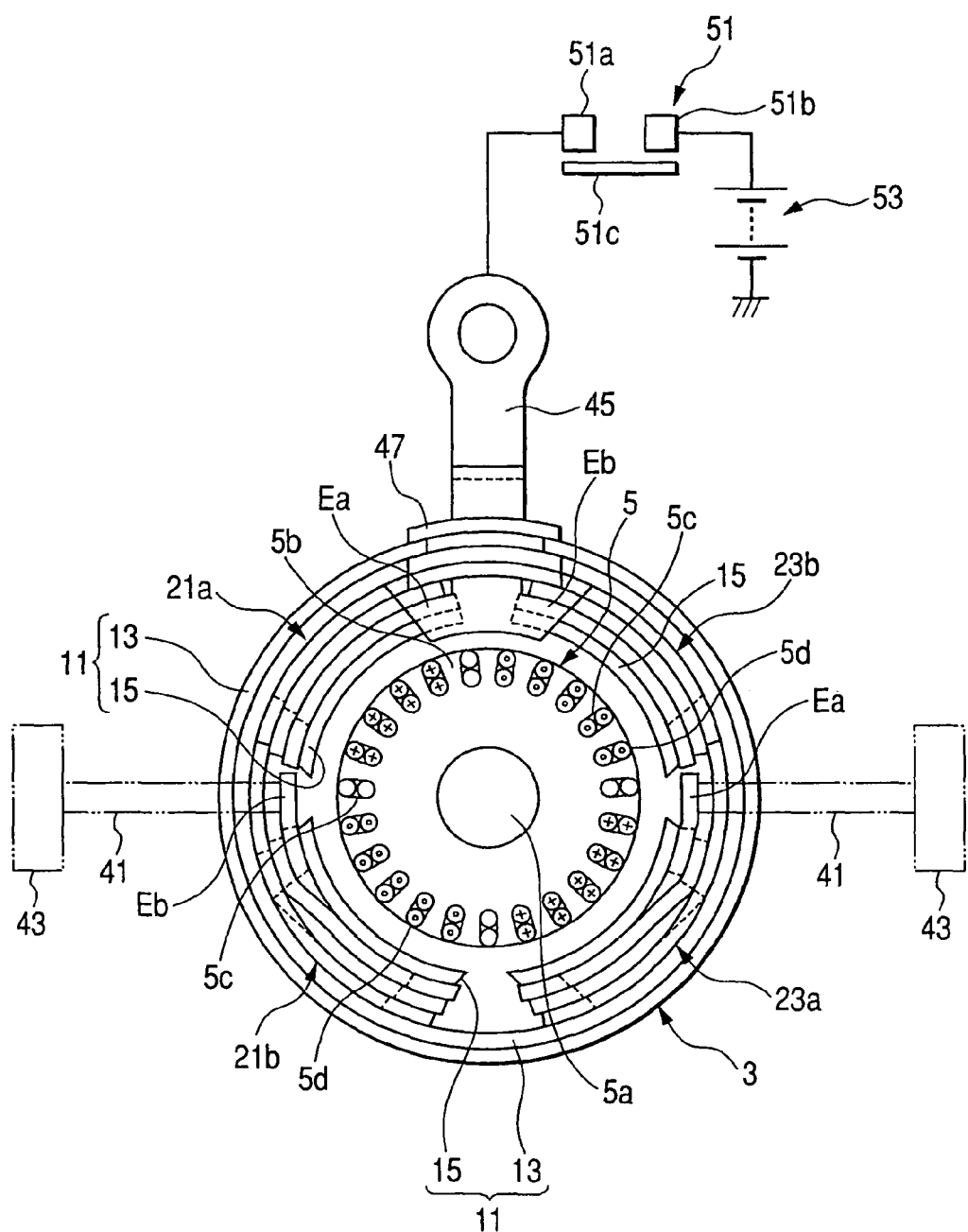
FIG. 1 is an axial plan view of a starter motor according to a first embodiment of the present invention.

Embodiments of the present invention will be described hereinafter with reference to the accompanying drawings. In the embodiments, like reference characters refer to like parts in several views.

First Embodiment

Referring to FIG. 1, there is illustrated a starter motor 1 for starting an engine of a vehicle; this starter motor 1 is an example of rotary electric machines according to a first embodiment of the present invention.

The starter motor 1 consists of a field coil assembly 3 serving as a stator thereof, and an armature (rotor) 5.

The armature 5 is made up of a rotary shaft 5a, and an annular armature core 5b mounted on the rotary shaft 5a to surround it. The armature core 5b has a plurality of groove-like slots 5c formed on an outer periphery of the armature core 5b to be arranged circumferentially at, for example, regular intervals.

The armature 5 is also made up of an armature winding 5d fitted in the slots 5c of the core 5b to be wound therearound.

The field coil assembly 3 is composed of a yoke assembly 11.

The yoke assembly 11 consists of a yoke 13 having a substantially ring shape, and four pole cores 15. The yoke 13 serves as a magnetic circuit for the field coil assembly 3.

As illustrated in FIGS. 1 and 2A, the yoke 13 is made up of an annularly rounded iron sheet as an example of ferromagnetic materials.

Specifically, the yoke 13 has an annular outer periphery, an annular inner periphery 13a opposing thereto, a first edge (upper edge in FIG. 2A) 13b, and a second edge 13c (lower edge in FIG. 2A) opposing thereto.

The four pole cores 15 are mounted on the inner periphery 13a of the yoke 13 at substantially regular intervals. Note that FIG. 2A is a developed view of the inner side of the yoke 13 of the field coil assembly 3 in a circumferential direction thereof.

Each of the four pole cores 15 is configured to radially project from the inner periphery 13a of the yoke 13 so as to have a substantially round rectangular cylindrical shape. Specifically, each of the four pole cores 15 has a pair of rounded upper corners 15a, a pair of rounded lower corners 15b opposing to each other, a pair of opposing longitudinal sides 15c, and a pair of opposing lateral sides 15d.

Each of the four pole cores 15 is formed at its projecting end with a flange 17 for supporting a field coil member described hereinafter.

The field coil assembly 3 is composed of a pair of first and second field coil members 21 and 23.

The first field coil member 21 is installed in any two of the four pole cores 15 circumferentially adjacent to each other, and the second field coil member 23 is installed in the remaining two of the four pole cores 15.

Figure 3:
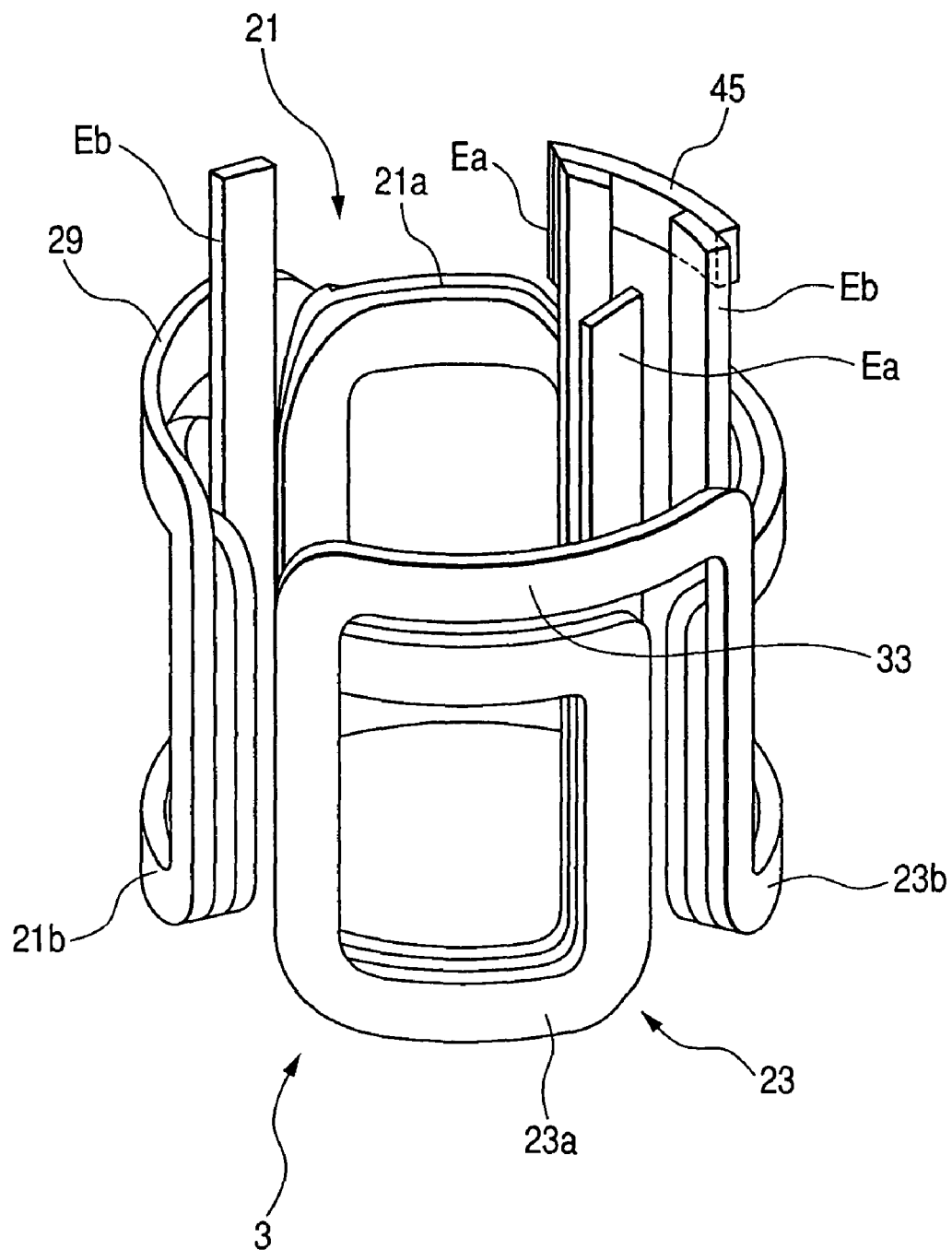
FIG. 3 is a perspective view schematically illustrating the field coil assembly illustrated in FIG. 2 except for the yoke assembly.

As illustrated in FIGS. 2 and 3, the first field coil member 21 consists of a pair of series-connected edgewise coil 21a and 21b. Similarly, the second field coil member 23 consists of a pair of series-connected edgewise coil 23a and 23b.

Next, a production procedure of the first field coil member 21 will be described hereinafter with reference to FIGS. 4A to 4F.

Figure 4A:
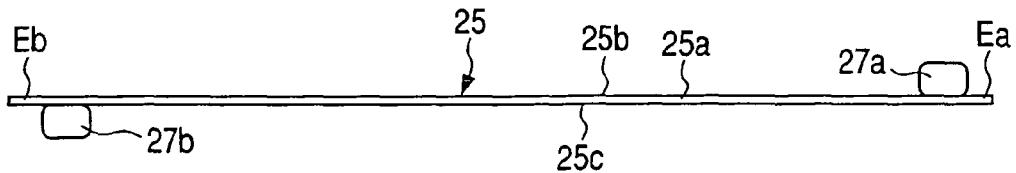
FIGS. 4A to 4F are process charts schematically illustrating a production procedure of a first field coil member of the field coil assembly illustrated in FIGS. 1 to 3.

As illustrated in FIG. 4A, in order to produce the first field coil member 21, one continuous rectangular wire strap 25 with a predetermined length suitable to produce the one filed coil member 21 and a pair of first and second coil forms 27a and 27b are prepared.

Each of the first and second coil forms 27a and 27b has a round rectangular cylindrical shape substantially equivalent to the shape of each of the cores 15. The rectangular wire strap 25 has a thickness substantially less than the width of its major sides 25a.

One minor side 25b of one end portion of the wire strap 25 is so contacted onto one longitudinal side of the periphery of one end of the first coil form 27a as to leave a predetermined lengthened end Ea thereof. The one end portion of the wire strap 25 is clamped by a clamp mechanism of the first coil form 27a so that the contact state between the one minor side 25b of the wire strap 25 and the one longitudinal side of the first coil form 27a is maintained.

Similarly, the other minor side 25c of the other end of the wire strap 25 is so contacted onto one longitudinal side of the periphery of the one end of the second coil form 27b as to leave a predetermined lengthened end Eb thereof. The other end portion of the wire strap 25 is clamped by a clamp mechanism of the second coil form 27b so that the contact state between the other minor side 25c of the wire strap 25 and the one longitudinal side of the second coil form 27b is maintained.

Figure 4B:
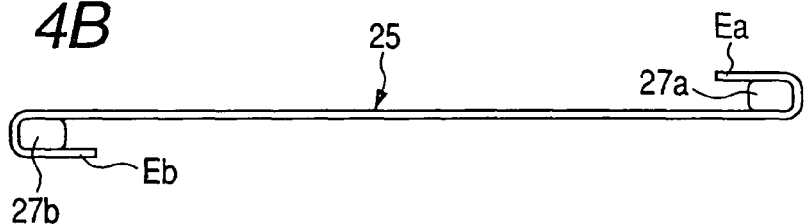

Next, as illustrated in FIG. 4B, the first and second coil forms 27a and 27b are respectively turned on their center axes at 180 degrees (half turn) in a predetermined direction, such as counter-clockwise direction in FIG. 4B, while they come close to each other under the wire strap 25 being subjected to a tension.

This allows the minor sides 25b and 25c of the one and the other end portions of the wire strap 25 to be wound edgewise on the peripheries of the first and second coil forms 27a and 27b, respectively.

Figure 4C:
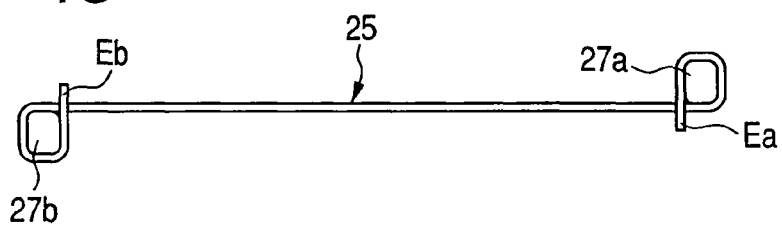

Next, as illustrated in FIG. 4C, the first and second coil forms 27a and 27b are respectively rotated on their center axes at 90 degrees in the counter-clockwise direction such that each of the start ends Ea and Eb of the wire strap 25 crosses over one of the major sides 25a of the wire strap 25. This forms a first convolution (first layer) wound edgewise around a corresponding one of the peripheries of the first and second coil forms 27a and 27b.

Figure 4D:
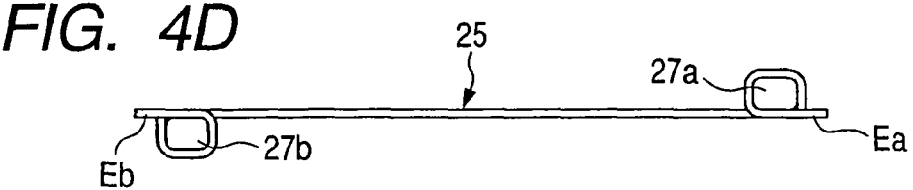

Thereafter, as illustrated in FIG. 4D, the first and second coil forms 27a and 27b are respectively turned on their center axes at 90 degrees in the counter-clockwise direction. In other words, the first and second coil forms 27a and 27b are respectively turned in counter-clockwise direction on their center axes at 360 degrees (one turn) from their original states illustrated in FIG. 4A.

Thereafter, a predetermined number, such as one and half turns of the coil forms 27a and 27b in the counter-clockwise direction are carried out.

Specifically, execution of the substantially total two and half turns of the coil forms 27a and 27b allows the wire strap 25 to be wound at their minor sides 25b and 25c (at their edges) on the outer peripheries of the first and second coil forms 27a and 27b from the one and the other ends of the wire strap 25 toward the center thereof, respectively.

This forms successive three convolutions (partially two convolutions) of the wire strap 25 wound edgewise around the first and second coil forms 27a and 27b, respectively. The successive three loops proceed from the remaining center of the wire strap 25 away therefrom in the same axial directions of the first and second coil forms 27a and 27b (see FIGS. 4D and 4E).

Figure 4E:
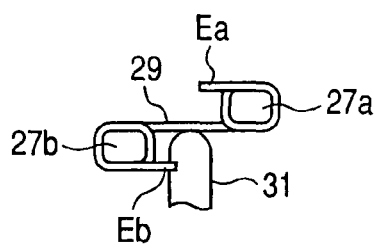

After completion of the substantially two and half turns of the coil forms 27a and 27b, a pair of spaced-apart coil elements coupled to each other with a link portion 29 is generated (see FIG. 4E).

Next, the center of the minor side 25c of the link portion 29 is contacted onto a curved surface of one end of a bending jig 31 with a predetermined curvature therealong.

Figure 4F:
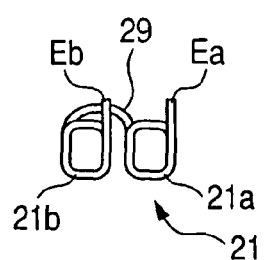

Thereafter, the pair of coil elements is folded at the contact portion of the link portion 29 with respect to the curved surface of the one end of the bending jig 31 such that:

the spaced-apart coil elements approach each other;

the start ends Ea and Eb of the wire strap 25 are substantially parallel to each other; and an end of the last convolution of the coil element corresponding to the second coil form 27b and the link portion 33 continuing therefrom are pressed away from the convolutions of the coil element corresponding to the second coil form 27b (see FIG. 4F).

Removal of the pair of coil elements from the first and second coil forms 27a and 27b provides the second field coil member 23 consisting of the pair of series-connected edgewise coils 23a and 23b (see FIG. 4F).

Thereafter, the first field coil member 21 is pressed to form a curved shape such that the link portion 29 projects outwardly with respect to the coils 21a and 21b (see FIG. 3); this curved shape is allowed to be arranged along the inner periphery 13a of the yoke 13.

Thereafter, the curved coil member 21 is arranged along the inner periphery 13a of the yoke 13. The coils 21a and 21b are fitted on the peripheries of any two of the four pole cores 15 circumferentially adjacent to each other such that:

the first convolution (first layer) of each of the coils 21a and 21b is arranged innermost in the axial direction thereof; and the last convolution (last layer) of each of the coils 21a and 21b is arranged outermost in the axial direction thereof.

Similarly, a production procedure of the second field coil member 23 will be described hereinafter with reference to FIGS. 5A to 5F.

Figure 5A:
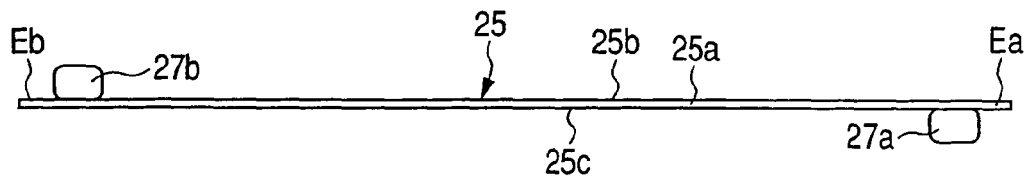
FIGS. 5A to 5F are process charts schematically illustrating a production procedure of a second field coil member of the field coil assembly illustrated in FIGS. 1 to 3.
Figure 5B:
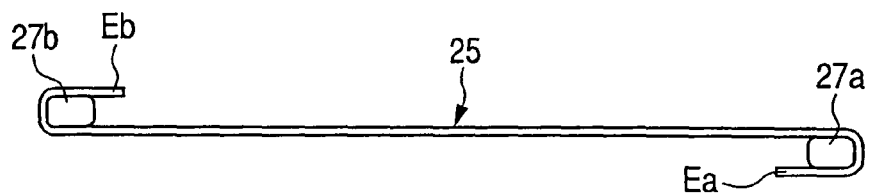
Figure 5C:
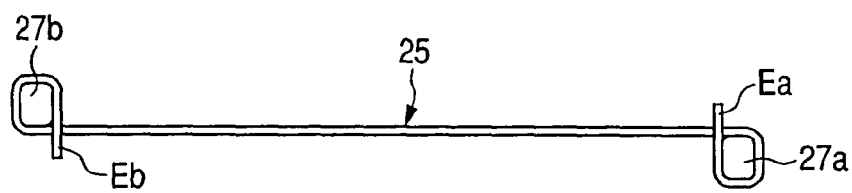
Figure 5D:
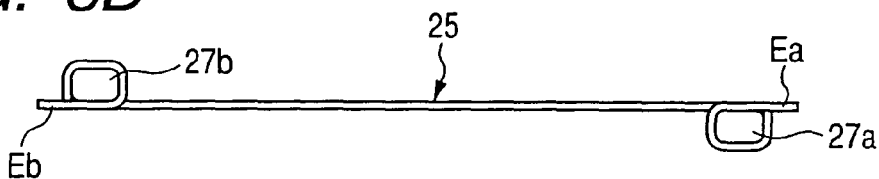

As illustrated in FIG. 5A, in order to produce the second field coil member 23, the identical wire strap 25 and the first and second coil forms 27a and 27b are prepared.

Each of the first and second coil forms 27a and 27b has a round rectangular cylindrical shape substantially equivalent to the shape of each of the cores 15. The rectangular wire strap 25 has a thickness substantially less than the width of its major sides 25a.

As compared with the production procedure of the first field coil member 21, the other minor side 25c of one end portion of the wire strap 25 is so contacted onto one longitudinal side of the periphery of one end of the first coil form 27a as to leave a predetermined lengthened end Ea thereof. The other minor side 25c of the one end portion of the wire strap 25 is clamped by the clamp mechanism of the first coil form 27a.

Similarly, the one minor side 25b of the other end of the wire strap 25 is so contacted onto one longitudinal side of the periphery of one end of the second coil form 27b as to leave a predetermined lengthened end Eb thereof. The one minor side 25b of the other end portion of the wire strap 25 is clamped by the clamp mechanism of the second coil form 27b.

In this way, like the first field coil member 21, substantially two and half turns of the coil forms 27a and 27b in the clockwise direction are carried out (see FIGS. 5B to 5E).

Specifically, execution of the substantially two and half turns of the coil forms 27a and 27b allows the wire strap 25 to be wound at their minor sides 25c and 25b (at their edges) on the outer peripheries of the first and second coil forms 27a and 27b from the one and the other ends of the wire strap 25 toward the center thereof, respectively.

This forms successive three convolutions (partially two convolutions) of the wire strap 25 wound edgewise around the first and second coil forms 27a and 27b, respectively. The successive three loops proceed from the remaining center of the wire strap 25 away therefrom in the same axial directions of the first and second coil forms 27a and 27b (see FIGS. 5D and 5E).

Figure 5E:
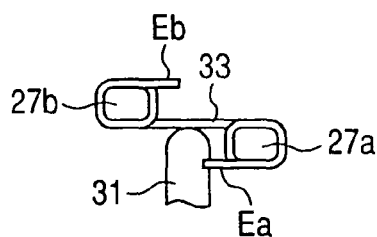

After completion of the substantially two and half turns of the coil forms 27a and 27b, a pair of spaced-apart coil elements coupled to each other with a link portion 33 is generated (see FIG. 5E).

Next, like the first field coil member 21, the center of the minor side 25c of the link portion 33 is contacted onto the curved surface of the one end of the bending jig 31.

Figure 5F:
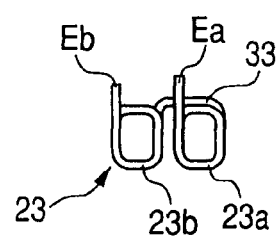

Thereafter, the pair of coil elements is folded at the contact portion of the link portion 33 with respect to the curved surface of the one end of the bending jig 31 such that:

the spaced-apart coil elements approach each other;

the start ends Ea and Eb of the wire strap 25 are substantially parallel to each other; and an end of the last convolution of the coil element corresponding to the first coil form 27a and the link portion 33 continuing therefrom are pressed away from the convolutions of the coil element corresponding to the first coil form 27a (see FIG. 5F).

Removal of the pair of coil elements from the first and second coil forms 27a and 27b provides the second field coil member 23 consisting of the pair of series-connected edgewise coils 23a and 23b (see FIG. 5F).

Thereafter, the second field coil member 23 is pressed to form a curved shape such that the link portion 33 projects outwardly with respect to the coils 23a and 23b (see FIG. 3); this curved shape is allowed to be arranged along the inner periphery 13a of the yoke 13.

Thereafter, the curved coil member 23 is arranged along the inner periphery 13a of the yoke 13. The coil 23b is fitted on the periphery of one of the remaining two pole cores 15 circumferentially adjacent to the pole 15 on which the coil 21a is fitted such that:

the first convolution (first layer) is arranged innermost in the axial direction thereof; and the last convolution (last layer) is arranged outermost in the axial direction thereof.

Similarly, the coil 23a is fitted on the periphery of the other of the remaining two pole cores 15 such that:

the first convolution (first layer) is arranged innermost in the axial direction thereof; and the last convolution (last layer) is arranged outermost in the axial direction thereof.

As illustrated in FIGS. 2 and 3, the start end Eb of the series-connected edgewise coil 21b serves as a coil end thereof. The coil end Eb extends toward the first edge 13b of the yoke 13 from one portion of the first convolution of the coil 21b in a direction orthogonal to the axial direction thereof and parallel to the axial direction of the yoke 13 so as to project outwardly from the first edge 13b of the yoke 13.

Similarly, the start end Ea of the series-connected edgewise coil 23a serves as a coil end thereof. The coil end Ea extends toward the first edge 13b of the yoke 13 from one portion of the first convolution of the coil 23a in a direction orthogonal to the axial direction thereof and parallel to the axial direction of the yoke 13 so as to project outwardly from the first edge 13b of the yoke 13.

The coil end Eb of the coil 21b and the coil end Ea of the coil 23a are electrically connected to lead wires 41, respectively. The lead wires 41 are electrically connected to positive brushes 43, respectively. The positive brushes 43 and negative brushes (not shown) provide electrical contact with the armature winding 5d.

The coil end Ea of the coil 21a and the coil end Eb of the coil 23b extend outwardly in parallel to the axial direction of the yoke 13, and they are electrically connected to one end of a lead plate 45.

The one end of the lead plate 45 is supported by a rubber grommet 47 fixedly placed between the yoke 13 and one end frame of the starter motor 1. The other end of the lead plate 25 is electrically connected to one fixed contact 51a of an electromagnetic switch 51, and the other fixed switch 51b is electrically connected to a battery 53. The electromagnetic switch 51 has a moving contact 51c mechanically linked to an actuator for the starter motor 1. The actuator works to move the moving contact 51c to allow electrical connection between both the fixed contacts 51a and 51b.

Specifically, as illustrated in FIGS. 1 and 2, the pair of series-connected field coils 21a and 21b and the pair of series-connected field coils 23a and 23b are parallely connected to the battery 53 via the electromagnetic switch 51.

When a starting trigger signal is input to the actuator so that the moving contact 51c is moved to allow electrical connection between both the fixed contacts 51a and 51b, a DC current is supplied from the battery 53 to parallely the coils 21a and 23b through the lead plate 45.

The DC current flowing through the coil 21a produces a magnetic flux in the axial direction of the coil 21a from the center of the yoke 13 toward the periphery thereof. Similarly, the DC current flowing through the coil 21b produces a magnetic flux in the axial direction of the coil 21b toward the center of the yoke 13.

The DC current flowing through the coil 23b produces a magnetic flux in the axial direction of the coil 23b toward the center of the yoke 13. Similarly, the DC current flowing through the coil 23a produces a magnetic flux in the axial direction of the coil 23a from the center of the yoke 13 toward the periphery thereof.

On the other hand, the DC current is supplied as an armature current to the armature winding 5d of the armature 5 via the coils 21b and 23a, the lead wires 41, and the brushes 43. Thus, the produced alternative directed magnetic fluxes in the yoke 13 in the circumferential direction thereof allows the armature 5 to rotate together with the rotary shaft 5a.

In the starter motor 1 illustrated in FIGS. 1 to 3, and 5 according to the first embodiment, during the process for manufacturing the second field coil member 23, the end of the last convolution of the coil 23a and the link portion 33 continuing therefrom are pressed away from the convolutions of the coil 23a (see FIG. 5F). This allows the link portion 33 to be non-overlapped with the convolutions of the coil 23a and to extend substantially parallel to the first edge 13b of the yoke 13.

Specifically, as illustrated in FIGS. 2 and 3, the link portion 29 continuing from the outermost convolution of the coil 21a extends upwardly from one rounded upper corner portion 15a of the pole core 15 corresponding to the coil 21a, and extends circumferentially above the convolutions of the coil 21b to continue to the outermost convolution of the coil 21b.

Thus, as illustrated in FIG. 2A, a crossover portion X between the start end Ea extending outwardly from the coil 23a and the link portion 33 is arranged not to be overlapped with the convolutions of the coil 23a.

This non-overlapped arrangement of the crossover portion X allows the number of layers (turns) of a portion of the coil 23a to be substantially equal to that of another portion thereof.

In the first embodiment, because substantially two and half turns of the coil forms 27a and 27b are carried out to produce each of the first and second field coil members 21 and 23, the number of layers of a portion X1 of the coil 23a is 3 equal to that of layers of another portion X2 thereof (see FIG. 2B).

Specifically, as illustrated in FIG. 2B, a space S1 for fitting therein the three layers of the coil 23a need be provided between the inner periphery 13a of the yoke 13 and the flange 17 of the corresponding pole core 15.

Accordingly, as compared with a case where a space S0 for fitting therein the four layers of the coil 140a is needed in the field coil assembly 200 illustrated in FIG. 20A, the configuration of the field coil assembly 3 increases a winding space factor representing a measure of the utilization of the space S1 by the convolutions of the coil 23a. This makes possible that the physical size of the field coil assembly 3 decreases as compared with that of the field coil assembly 200 illustrated in FIG. 20A, thereby reducing in size the starter motor 1.

In addition, the non-overlapped arrangement of the crossover portion X allows the number of layers of the coil 23a to be equal to or lower than 3. This makes possible that the difference between the number of turns of a portion Y of the coil 23b and that of turns of any portion of the coil 23a is set to be, at most, 1.

That is, the number of turns of the coil 23a is set to be substantially equal to that of turns of the coil 23b. For this reason, when a DC current is supplied to flow through the series-connected edgewise coils 23a and 23b, it is possible to balance the magnetic fluxes to be produced respectively by the coils 23a and 23b based on the DC current.

For the same reasons as the second field coil member 23 mentioned above, the number of turns of the coil 21a is set to be substantially equal to that of turns of the coil 21b. Thus, when a DC current is supplied to flow through the series-connected edgewise coils 21a and 21b, it is possible to balance the magnetic fluxes to be produced respectively by the coils 21a and 21b based on the DC current.

The balance in the magnetic fluxes to be produced respectively by the coils 21a, 21b, 23a, and 23b contributes to reduction of variations in the output torque of the starter motor 1 because the output torque is in proportion to the magnitude of the magnetic flux produced by each of the coils 21a, 21b, 23a, and 23b. In addition, the balance also contributes to preventing the commutation between the brushes and the armature winding 5d from deteriorating.

Second Embodiment

Figure 6:
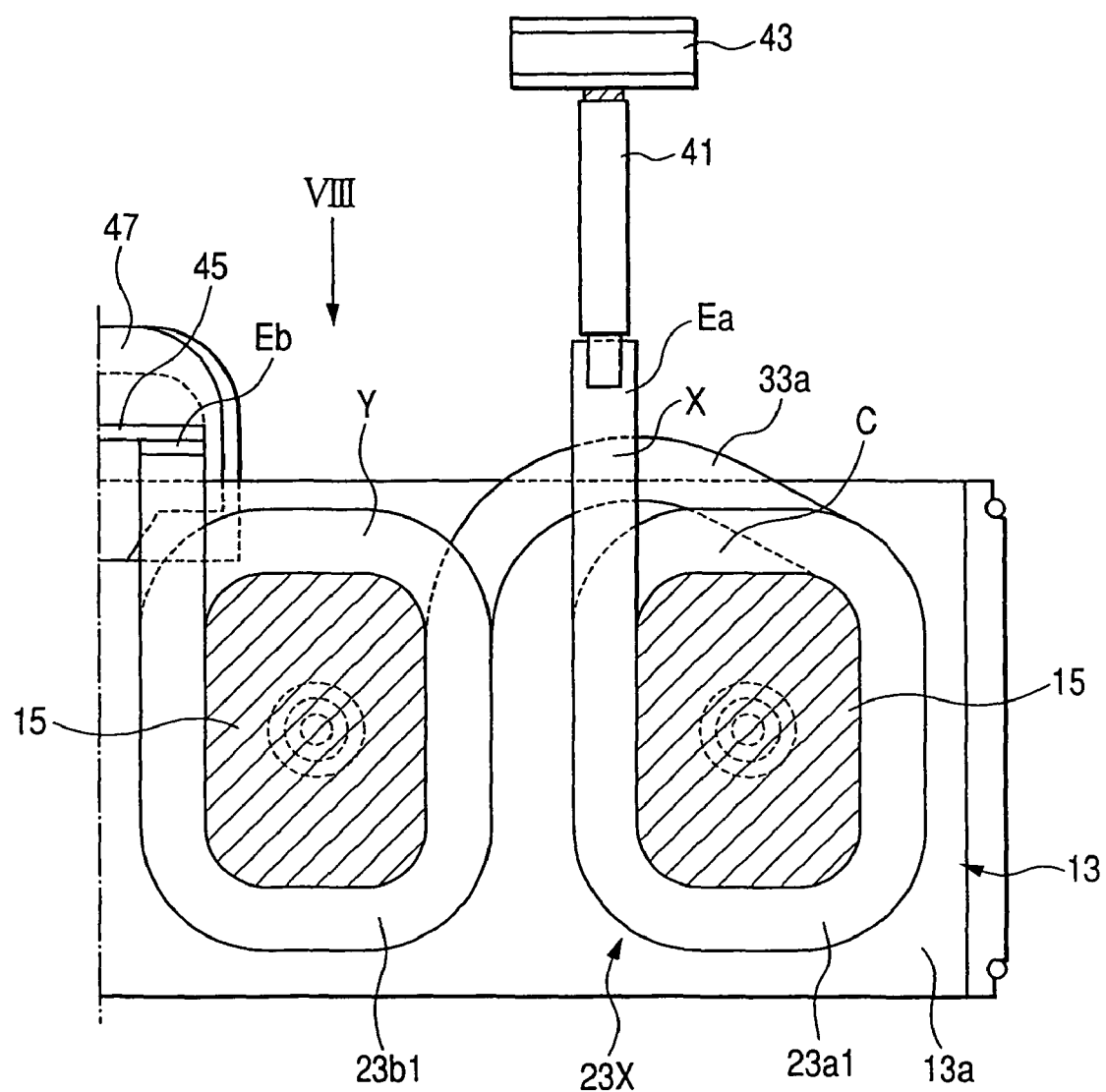
FIG. 6 is a partially cross-sectional circumferential developed view of part of the inner periphery of a yoke of a field coil assembly according to a second embodiment of the present invention.

FIG. 6 is a circumferential developed view of part of the inner periphery 13a, which includes two pole cores 15, of a yoke 13 of a field coil assembly 3a according to a second embodiment of the present invention. Like parts between the field coil assemblies 3a and 3, to which like reference characters are assigned, are omitted or simplified in description.

On the two pole cores 15, series-connected edgewise coils 23a1 and 23b1 of a second field coil member 23X of the field coil assembly 3a are fitted, respectively.

As illustrated in FIG. 6, the field coil assembly 3a according to the second embodiment is designed, like the field coil assembly 3 according to the first embodiment.

Specifically, a link portion 33a is arranged to be non-overlapped with the convolutions of the coil 23a so that a crossover portion X between the start end Ea extending outwardly from the coil 23a1 and the link portion 33a is arranged not to be overlapped with the convolutions of the coil 23a1. Note that, in the second embodiment, the link portion 33a is configured to obliquely extend with respect to the first edge 13b of the yoke 13.

In the second embodiment, the field coil assembly 3a is wound edgewise around the peripheries of the first and second coil forms 27a and 27b in a different manner from that used for the field coil assembly 3 according to the first embodiment.

Figure 7A:
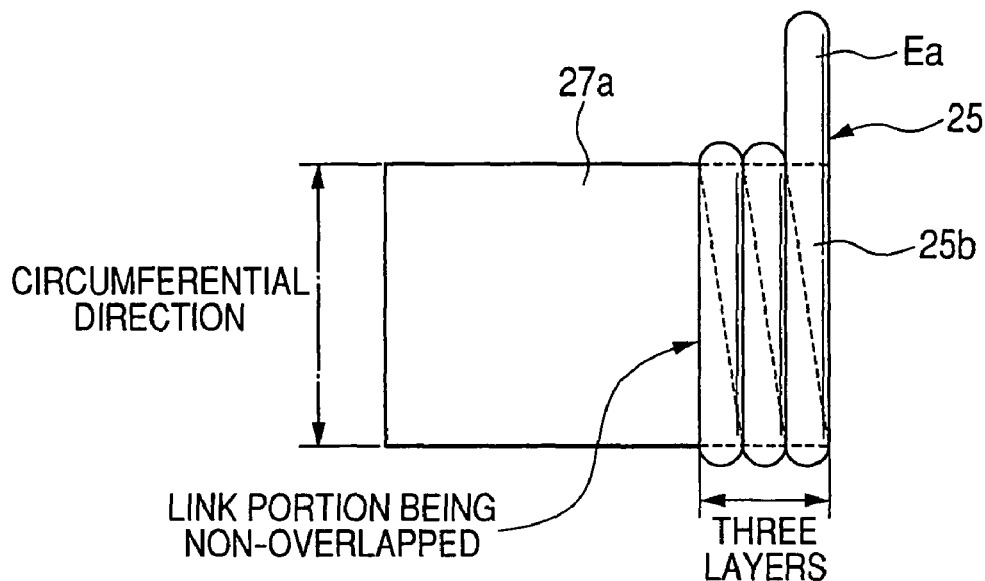
FIG. 7A is a view schematically illustrating a manner of edgewise winding of a rectangular wire strap according to the first embodiment.
Figure 7B:
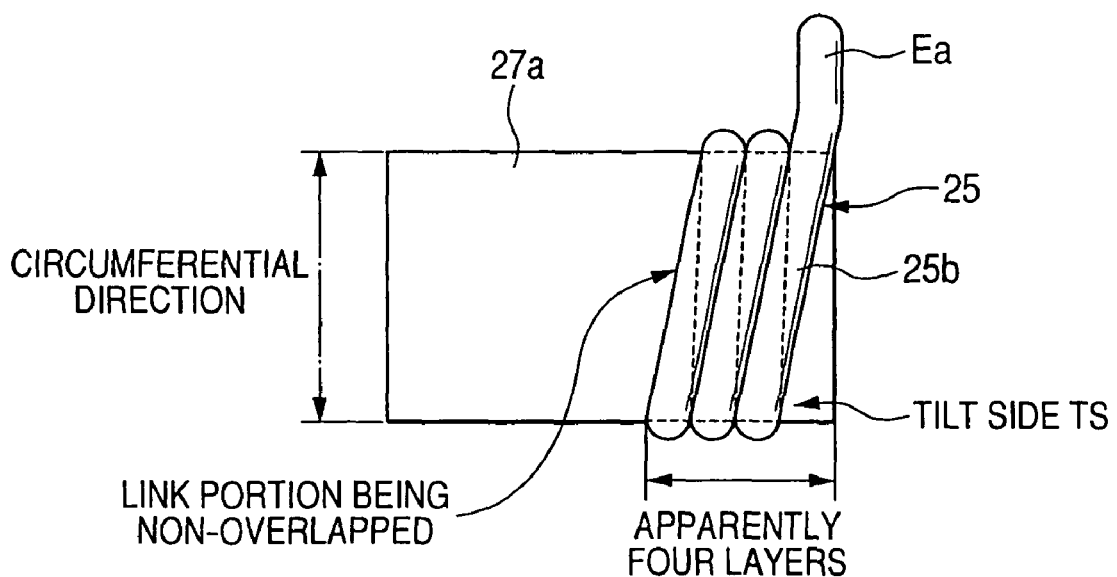
FIG. 7B is a view schematically illustrating a manner of edgewise winding of the rectangular wire strap according to the second embodiment.

FIG. 7A schematically illustrates the manner of edgewise winding of the rectangular wire strap 25 according to the first embodiment. FIG. 7B schematically illustrates the manner of edgewise winding of the rectangular wire strap 25 according to the second embodiment.

As illustrated in FIG. 7A, in the first embodiment, the wire strap 25 is wound around the periphery of one end of the first coil form 27a in the circumferential direction thereof toward the other end of the first coil form 27a.

In contrast, as illustrated in FIG. 7B, in the second embodiment, the one end of the wire strap 25 is wound around the periphery of one end of the first coil form 27a in a direction tilted from the circumferential direction thereof toward the other end of the wire strap 25.

Similarly, the other end of the wire strap 25 is wound around the periphery of one end of the second coil form 27b in a direction tilted from the circumferential direction thereof toward the one end of the wire strap 25.

Specifically, removal of the pair of coil elements from the first and second coil forms 27a and 27b (see FIG. 5F) provides the second field coil member 23X consisting of the pair of series-connected edgewise coils 23a1 and 23b1.

FIG. 8A substantially illustrates the second field coil member 23X viewed on arrow VIII of FIG. 6 before the second field coil member 23X is pressed to form the curved shape allowed to be arranged along the inner periphery 13a of the yoke 13.

As illustrated in FIGS. 7A and 8A, the number of layers of the coil 23a1 at the tilt side TS1 thereof appears to be 4. For this reason, when the second field coil member 23X is simply installed on the inner periphery 13a of the yoke 13 after being pressed to form the curved shape, a space S0A for fitting therein four layers of the second field coil member 23X need be provided between the inner periphery 13a of the yoke 13 and the flange 17 of the corresponding pole cores 15.

However, in the second embodiment, the crossover portion X between the start end Ea extending outwardly from the coil 23a1 and the link portion 33a is arranged to be non-overlapped with the convolutions of the coil 23a1. The non-overlapped configuration of the crossover portion X allows:

a portion C of the coil 23a1, whose number of layers is 2 lower than 3, to be formed between the coil end Ea of the coil 23a1 and the link portion 33; and the number of layers of the remaining portions of the coil 23a1 to be 3.

Thus, in the second embodiment, concurrently with the second coil member 23X being pressed to form the curved shape, the first and second layers of the coil 23a1 are pressed inwardly at the portion C thereof so as to be stepped inwardly thereat. This allows the tilt side TS1 of the coil 23a1 to be substantially aligned with the coil end Ea thereof (see FIG. 8C).

In addition, concurrently with the second coil member 23X being pressed to form the curved shape, the first and second layers of the coil 23b1 are pressed inwardly at the portion Y thereof so as to be stepped inwardly thereat. This allows a tilt side TS2 of the coil 23b1 to be substantially aligned with the coil end Eb thereof (see FIG. 8C).

Accordingly, after the coils 23a1 and 23b1 are fitted from their outermost layers (last convolutions) on the corresponding two pole cores 15, the number of turns of the coils 23a1 and 23b1, such as three turns, are substantially matched with each other around the corresponding pole cores 15.

Accordingly, like the first embodiment, it is only necessary to allocate a space S1A for fitting therein three layers of the coils 23a1 and 23b1 between the inner periphery 13a of the yoke 13 and the flanges 17 of the corresponding pole cores 15.

This enables a winding space factor representing a measure of the utilization of the space S1A by the convolutions of the coils 23a1 and 23b1 to increase.

The increase in the winding space factor of the field coil assembly 3a makes it possible to reduce the physical size of the field coil assembly 3a as compared with that of the field coil assembly 200 illustrated in FIG. 20A, thereby reducing in size the starter motor 1.

In addition, as well as the first embodiment, because the number of turns of the coil 23a1 is set to be substantially equal to that of turns of the coil 23b1, it is possible to balance the magnetic fluxes to be produced respectively by the coils 23a1 and 23b1 based on the DC current flowing therethrough.

Moreover, in the second embodiment, concurrently with the second coil member 23X being pressed to form the curved shape, the first and second layers of the coils 23a1 and 23b1 are pressed inwardly at the portions C and Y thereof so as to be stepped inwardly thereat, respectively. This can easily produce the second coil member 23× without additional processes.

For the same reasons as the second field coil member 23X mentioned above, when the first field coil member 21 is similar in configuration to the second field coil member 23X, the effects set forth above obtained by the second field coil member 23X can also be obtained.

Third Embodiment

Figures 9A, 9B:
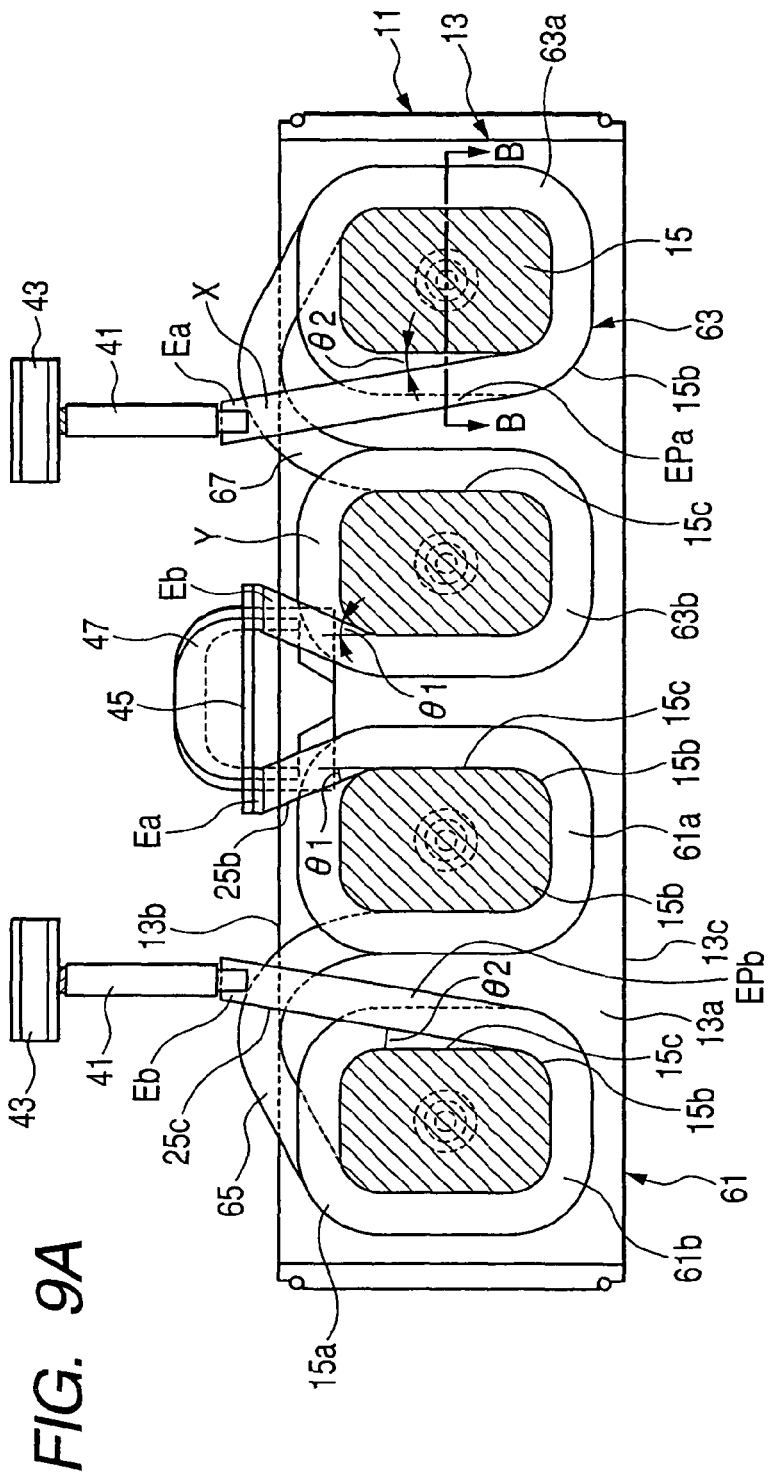
FIG. 9A is a partially cross-sectional circumferential developed view of the inner periphery of a yoke of a yoke assembly of a field coil assembly of a starter motor in a circumferential direction thereof according to a third embodiment of the present invention.
FIG. 9B is a cross sectional view of the field coil assembly take on line B-B of FIG. 9A.

FIG. 9A is a circumferential developed view of the inner periphery 13a of a yoke 13 of a field coil assembly 3b according to a third embodiment of the present invention. Like parts between the field coil assemblies 3b and 3, to which like reference characters are assigned, are omitted or simplified in description.

The field coil assembly 3b is composed of a pair of first and second field coil members 61 and 63.

The first field coil member 61 is installed in any two of the four pole cores 15 circumferentially adjacent to each other, and the second field coil member 63 is installed in the remaining two of the four pole cores 15.

Like the first and second embodiments, as illustrated in FIG. 9A, the first field coil member 61 consists of a pair of edgewise coil 61a and 61b connected to each other in series via a link portion 65. Similarly, the second field coil member 63 consists of a pair of edgewise coil 63a and 63b connected to each other in series via a link portion 67.

Each of the first and second field coil member 61 and 63 is produced by winding edgewise the rectangular wire strap 25 with a predetermined length suitable to produce a corresponding one of the first and second field coil member 61 and 63 in a corresponding one of the manners described hereinafter.

The rectangular wire strap 25 has opposing major sides 25a and opposing minor sides 25b and 25c, and has a thickness between the minor sides 25b and 25c substantially less than the width of its major sides 25a.

Each of the edgewise coils 61a and 61b has a number of convolutions, and each of the edgewise coils 63a and 63b also has a number of convolutions.

The coils 61a and 61b are fitted on the peripheries of any two of the four pole cores 15 circumferentially adjacent to each other such that the convolutions of each of the coils 61a and 61b are arranged to be layered from the inner periphery 13a of the yoke 13 to the corresponding flange 17 in the axial direction thereof.

Similarly, the coils 63a and 63b are fitted on the peripheries of the remaining two pole cores 15 such that:

the coil 53b is fitted on the periphery of one of the remaining two pole cores 15 circumferentially adjacent to the pole 15 on which the coil 61a is fitted; and the convolutions of each of the coils 63a and 63b are arranged to be coaxially layered from the inner periphery 13a of the yoke 13 to the corresponding flange 17.

An end portion EPa of the innermost convolution of the coil 61a is wound around one rounded lower corner 15b of the corresponding pole core 15 circumferentially adjacent to the coil 63b and extends therefrom along a longitudinal side 15c thereof in the axial direction of the yoke 13.

A coil end Ea of the end portion EPa of the innermost convolution of the coil 61a extends outwardly toward the first edge 13b of the yoke 13 from a starting point on one rounded upper corner 15a of the corresponding pole core 15 such that the minor side 25b thereof is tilted at an angle of θ1 from the longitudinal side 15c in parallel to a tangential direction at the starting point of the one rounded upper corner 15a.

Similarly, an end portion EPb of the innermost convolution of the coil 63b is wound around one rounded lower corner 15b of the corresponding pole core 15 circumferentially adjacent to the coil 61a and extends therefrom along a longitudinal side 15c thereof in the axial direction of the yoke 13.

A coil end Eb of the end portion EPb of the innermost convolution of the coil 63b extends outwardly toward the first edge 13b of the yoke 13 from a starting point on one rounded upper corner 15a of the corresponding pole core 15 such that the minor side 25b thereof is tilted at the angle of θ1 from the longitudinal side 15c in parallel to a tangential direction at the starting point of the one rounded upper corner 15a.

Like the first embodiment, the coil end Ea of the coil 61a and the coil end Eb of the coil 63b are electrically connected to one end of the lead plate 45 supported by the rubber grommet 47.

An end portion EPb of the innermost convolution of the coil 61b is wound around one rounded lower corner 15b of the corresponding pole core 15 circumferentially adjacent to the coil 61a and extends outwardly toward the first edge 13b of the yoke 13 from a starting point on the one rounded lower corner 15b such that the minor side 25c thereof is tilted at an angle of θ2 from a longitudinal side 15c of the corresponding pole 15 continuing from the one rounded lower corner 15b in parallel to the axial direction of the yoke 13.

Similarly, an end portion EPa of the innermost convolution of the coil 63a is wound around one rounded lower corner 15b of the corresponding pole core 15 circumferentially adjacent to the coil 63b and extends outwardly toward the first edge 13b of the yoke 13 from a starting point on the one rounded lower corner 15b such that the minor side 25c thereof is tilted at the angle of θ2 from a longitudinal side 15c of the corresponding pole 15 continuing from the one rounded lower corner 15b in parallel to the axial direction of the yoke 13.

A coil end Eb of the end portion EPb of the coil 61b and an coil end Ea of the end portion EPa of the coil 63a are electrically connected to the lead wires 41, respectively. The lead wires 41 are electrically connected to the positive brushes 43, respectively.

Next, a production procedure of the second field coil member 63 will be described hereinafter with reference to FIGS. 10A to 10G.

Figure 10A:
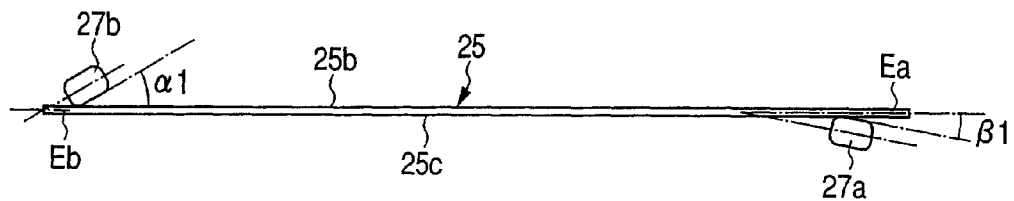
FIGS. 10A to 10G are process charts schematically illustrating a production procedure of a second field coil member of the field coil assembly illustrated in FIG. 9A.

As illustrated in FIG. 10A, the minor side 25c of one end portion of the wire strap 25 is contacted onto one rounded corner of the periphery of one end of the first coil form 27a such that:

a predetermined lengthened end Ea is left thereon; and a direction of one longitudinal side of the first coil form 27a contacting onto the minor side 25c is tilted at an angle of β1 from the minor side 25c.

The angle of β1 is substantially equivalent to the angle of θ2.

The one end portion of the wire strap 25 is clamped by the clamp mechanism of the first coil form 27a so that the contact state between the one end of the wire strap 25 and the one rounded corner of the first coil form 27a is maintained.

Similarly, the minor side 25b of the other end of the wire strap 25 is contacted onto one rounded corner of the periphery of one end of the second coil form 27b such that:

a predetermined lengthened end Eb is left thereon; and a direction of one longitudinal side of the second coil form 27b contacting onto the minor side 25b is tilted at an angle of α1 from the minor side 25b.

The angle of α1 is substantially equivalent to the angle of θ1.

The other end portion of the wire strap 25 is clamped by the clamp mechanism of the second coil form 27b so that the contact state between the other end of the wire strap 25 and the one rounded corner of the second coil form 27b is maintained.

Figure 10B:
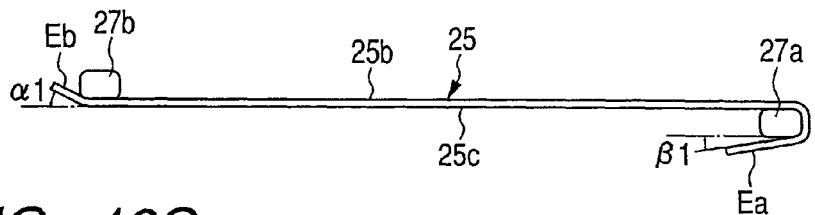
Figure 10C:
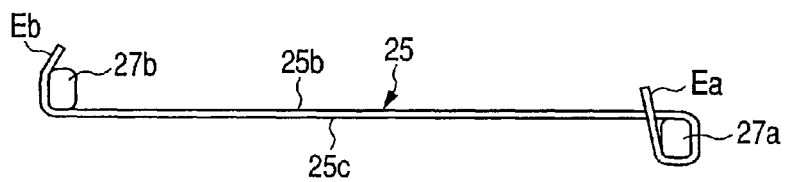
Figure 10D:
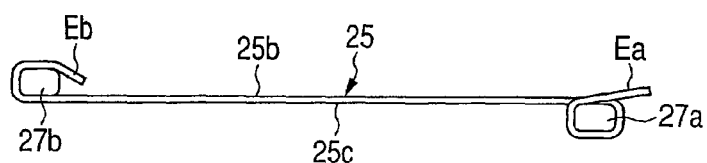

Next, as illustrated in FIG. 10B, the second coil form 27b is turned on its center axis at the angle of α1 in clockwise direction in FIG. 10B. Because the contact state between the other end of the wire strap 25 and the one rounded corner of the second coil form 27b is maintained, the end Eb of the wire strap 25 is tilted at the angle of α1 from the longitudinal direction of the remaining wire strap 25.

On the other hand, as illustrated in FIG. 10B, the first coil form 27a is turned on its center axis at an angle of (180−β1) degrees in clockwise direction in FIG. 10B. Because contact state between the one end of the wire strap 25 and the one rounded corner of the first coil form 27a is maintained, a direction of the minor side 25c of the end Ea of the wire strap 25 is tilted at the angle of β1 from the one longitudinal side of the first coil form 27a.

Thereafter, like the second field coil member 23 according to the first embodiment, rotation of the coil form 27b in the clockwise direction at 180 degrees (half turn) is carried out. This allows the minor side 25b of the other end portion of the wire strap 25 to be wound edgewise on the periphery of the second coil form 27b (see FIGS. 10B to 10D).

In this way, after the half turn, two turns of the second coil form 27b in the clockwise direction are carried out. This allows the minor side 25b of the other end portion of the wire strap 25 to be wound edgewise on the periphery of the second coil form 27b. This forms successive three convolutions (partially two convolutions) of the wire strap 25 wound edgewise around the second coil form 27b. The successive three loops proceed from the wire strap 25 away therefrom in the same axial directions of the second coil form 27b (see FIGS. 10D and 10E).

On the other hand, like the second field coil member 23 according to the first embodiment, rotation of the coil form 27b in the clockwise direction at 180 degrees (half turn) is carried out. This allows the minor side 25c of the other end portion of the wire strap 25 to be wound edgewise on the periphery of the first coil form 27a (see FIGS. 10C to 10D).

In this way, for example, the substantially total two and half turns of the first coil form 27a in the clockwise direction from the original state illustrated in FIG. 10A are carried out. This allows the minor side 25c of the one end portion of the wire strap 25 to be wound edgewise on the periphery of the first coil form 27a. This forms successive three convolutions (partially two convolutions) of the wire strap 25 wound edgewise around the first coil form 27a. The successive three loops proceed from the wire strap 25 away therefrom in the same axial directions of the first coil form 27a (see FIGS. 10D and 10E).

Figure 10E:
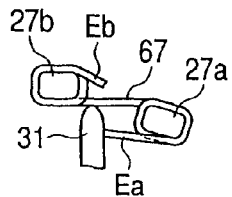

Specifically, after completion of the substantially two and half turns of the coil forms 27a and 27b, a pair of spaced-apart coil elements coupled to each other with a link portion 67 is generated (see FIG. 10E).

Next, one end of the minor side 25c of the link portion 67 close to the coil form 27b is contacted onto the curved surface of the one end of the bending jig 31.

Figure 10F:
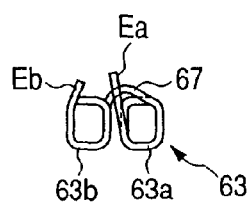

Thereafter, the pair of coil elements is folded at the contact portion of the link portion 67 with respect to the curved surface of the one end of the bending jig 31 such that:

the spaced-apart coil elements approach each other;

the start ends Ea and Eb of the wire strap 25 are substantially parallel to each other; and an end of the last convolution of the coil element corresponding to the first coil form 27a and the link portion 33 continuing therefrom are pressed away from the convolutions of the coil element corresponding to the first coil form 27a (see FIG. 10F).

Removal of the pair of coil elements from the first and second coil forms 27a and 27b provides the second field coil member 63 consisting of the pair of series-connected edgewise coils 63a and 63b (see FIG. 10F).

Figure 10G:
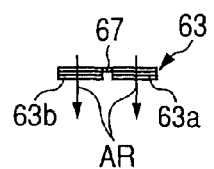

As illustrated in FIG. 10G, the series-connected edgewise coils 63a and 63b are formed at the same side of the link portion 67, which is similar to the series-connected edgewise coils 21 and 23 according to the first embodiment. Note that, in FIG. 10G, arrows AR show directions of magnetic fluxes produced by the coils 63a and 63b when a DC current is supplied from the coil end Eb of the coil 63b to the coil end Ea of the coil 63a.

Thereafter, the second field coil member 63 is pressed to form a curved shape such that the link portion 67 projects outwardly with respect to the coils 63a and 63b; this curved shape is allowed to be arranged along the inner periphery 13a of the yoke 13.

Thereafter, the curved coil member 63 is arranged along the inner periphery 13a of the yoke 13. The coils 63a and 63b are fitted on the peripheries of any two of the four pole cores 15 circumferentially adjacent to each other such that:

the first convolution (first layer) of each of the coils 63a and 63b is arranged innermost in the axial direction thereof; and the last convolution (last layer) of each of the coils 63a and 63b is arranged outermost in the axial direction thereof.

Because a production procedure of the first field coil member 61 is substantially similar to a combination of the production procedure of the second field coil member 63 and that of the first field coil member 21 according to the first embodiment, the descriptions of which are omitted.

Specifically, as illustrated in FIG. 10H, the minor side 25b of the one end of the wire strap 25 is contacted onto one rounded corner of the periphery of one end of the first coil form 27a such that:

the predetermined lengthened end Ea is left thereon; and one longitudinal side of the first coil form 27a noncontact onto the minor side 25b is tilted at the angle of α1 from the minor side 25b.

The angle of α1 is substantially equivalent to the angle of θ1.

The one end portion of the wire strap 25 is clamped by the clamp mechanism of the first coil form 27a so that the contact state between the other end of the wire strap 25 and the one rounded corner of the first coil form 27a is maintained.

Similarly, the minor side 25c of the other end portion of the wire strap 25 is contacted onto one rounded corner of the periphery of one end of the second coil form 27b such that:

the predetermined lengthened end Eb is left thereon; and one longitudinal side of the second coil form 27b contacting onto the minor side 25c is tilted at the angle of β1 from the minor side 25c.

The angle of β1 is substantially equivalent to the angle of θ2.

The other end portion of the wire strap 25 is clamped by the clamp mechanism of the second coil form 27b so that the contact state between the other end of the wire strap 25 and the one rounded corner of the second coil form 27b is maintained.

Thereafter, the same production procedure of the first coil member 21 is carried out (see FIGS. 4A to 4F).

Therefore, the curved coil member 61 is arranged along the inner periphery 13a of the yoke 13. The coil 61a is fitted on the periphery of one of the remaining two pole cores 15 circumferentially adjacent to the pole 15 on which the coil 63b is fitted such that:

the first convolution (first layer) is arranged innermost in the axial direction thereof; and the last convolution (last layer) is arranged outermost in the axial direction thereof.

Similarly, the coil 63b is fitted on the periphery of the other of the remaining two pole cores 15 such that:

the first convolution (first layer) is arranged innermost in the axial direction thereof; and the last convolution (last layer) is arranged outermost in the axial direction thereof.

In the starter motor 1 illustrated in FIGS. 9 and 10 according to the third embodiment, change of the angle of θ1 allows the extending direction of the coil end of each of the coils 61a and 63b to be adjusted. Similarly, change of the angle of θ2 allows the extending direction of the coil end of each of the coils 63a and 61b to be adjusted.

Thus, even though the coil end of each of the coils 61b and 63a and the corresponding brush 43 are shifted in position in the circumferential direction of the yoke 13, electrical connection between the coil end of each of the coils 61b and 63a and the corresponding brush 43 can be easily established without using any electrical connection members. This makes it possible to increase the flexibility in design of the starter motor 1, and reduce parts count for the starter motor 1 to thereby prevent the increase in the cost thereof.

Moreover, in the embodiment, the angle of θ1 or θ2 of the coil end of each of the first and second series-connected coil members 61 and 63 is previously defined to the corresponding wire strap 25 before the corresponding rectangular wire strap 25 is formed into the corresponding coil member.

Thus, winding of the corresponding rectangular wire strap 25 around each of the first and second coil forms 27a and 27b allows either the pair of coils 61a and 61b or coils 63a and 63b and their coil ends Ea and Eb respectively having the inclined angles of θ1 and θ2 with respect to a direction parallel to the axial direction of the yoke 13 to be integrally formed.

This can eliminate the necessity of bending the coil ends Ea and Eb of either the coils 61a and 61b or the coils 63a and 63b after the winding process. This makes it possible to produce:

both the paired coils 61a and 61b and the paired coils 63a and 63b to be fitted on the corresponding pole cores 15 with high dimensional accuracy; and the coil ends respectively extending from the paired coils 61a and 61b and the paired coils 63a and 63b with high dimensional accuracy.

In addition, even if, as the rectangular wire strap 25, an insulating-film coated wire strap is used to form at least one of the field coil members 61 and 63, elimination of the necessity of bending the coil ends Ea and Eb of either the coils 61a and 61b or the coils 63a and 63b after the winding process can prevent the insulating-film of the insulating-film coated wire strap from being fallen off.

As described above, in the third embodiment, one pair of series-connected field coils can be produced from the one rectangular wire strap 25. Thus, as compared with a case of producing a coil from one rectangular wire strap, higher accuracy of dimension for producing one pair of series-connected field coils is required.

In order to meet the requirement, in the third embodiment, the angle of θ1 or θ2 of the coil end of each of the first and second series-connected coil members 61 and 63 is previously defined to the corresponding wire strap 25 before the corresponding rectangular wire strap 25 is formed into the corresponding coil member. In addition, each of the first and second coil members 61 and 63 is configured to be securely fitted on the corresponding pole cores 15. This makes possible to prevent each of the first and second coil members 61 and 63 from being disarrayed.

In addition, like the first embodiment, a crossover portion X between the coil end Ea extending outwardly from the coil 63a and the link portion 67 is arranged not to be overlapped with the convolutions of the coil 63a.

This non-overlapped arrangement of the crossover portion X allows the number of layers (turns) of a portion of the coil 23a to be substantially equal to that of another portion thereof (see FIG. 9B).

Accordingly, the non-overlapped arrangement of the crossover portion X makes it possible to obtain the effects obtained in the first embodiment set forth above.

In the third embodiment, as described above, the series-connected edgewise coils 63a and 63b are produced to be formed at the same side of the link portion 67, but the present invention is not limited to the production process and the coil configuration.

Specifically, as a modification of the third embodiment, a production procedure of a second field coil member 63X will be described hereinafter with reference to FIGS. 11A to 11G.

Figure 11A:
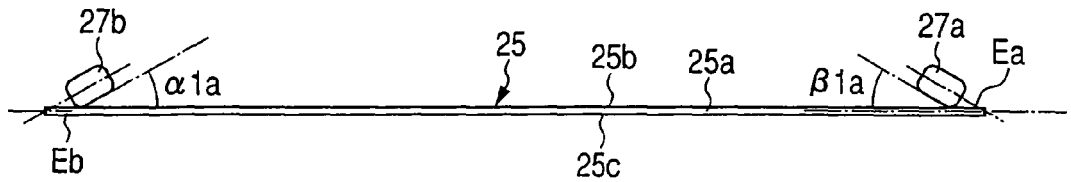
FIGS. 11A to 11G are process charts schematically illustrating a production procedure of a second field coil member according to a modification of the third embodiment.
Figure 11B:
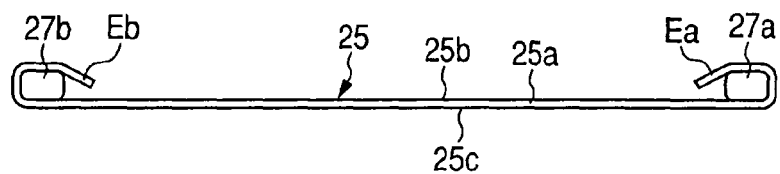
Figure 11C:
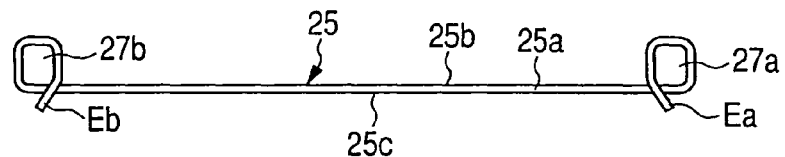
Figure 11D:
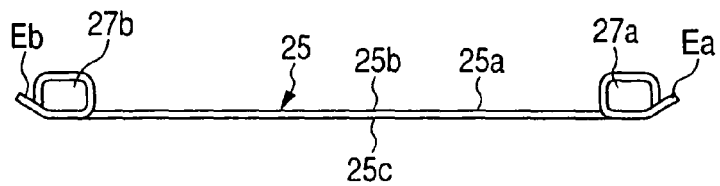

As illustrated in FIG. 11A, the minor side 25b of one end portion of the wire strap 25 is contacted onto one rounded corner of the periphery of one end of the first coil form 27a such that:

a predetermined lengthened end Ea is left thereon; and
a direction of one longitudinal side of the first coil form 27a contacting onto the minor side 25b is tilted at an angle of β1a from the minor side 25b.

The angle of β1a is substantially equivalent to the angle of θ2.

The one end portion of the wire strap 25 is clamped by the clamp mechanism of the first coil form 27a so that the contact state between the one end of the wire strap 25 and the one rounded corner of the first coil form 27a is maintained.

Similarly, the minor side 25b of the other end portion of the wire strap 25 is also contacted onto one rounded corner of the periphery of one end of the second coil form 27b such that:

a predetermined lengthened end Eb is left thereon; and
a direction of one longitudinal side of the second coil form 27b contacting onto the minor side 25b is tilted at the angle of β1a from the minor side 25b at an angle of α1a equivalent to the angle of β1a from the minor side 25b.

The angle of α1a is substantially equivalent to the angle of θ1.

Next, turn of the first coil form 27a at the angle of β1a in counter-clockwise direction is carried out. Thereafter, half turn of the first coil form 27a in the counter-clockwise direction (FIG. 11B) and thereafter turn of it at 90 degrees in the counter-clockwise direction (FIG. 11C) are carried out so that the start end Ea of the wire strap 25 crosses over one of the major sides 25a of the wire strap 25.

This forms a first convolution (first layer) wound edgewise around the periphery of the first coil form 27a.

Similarly, turn of the second coil form 27b at the angle of α1a in clockwise direction is carried out. Thereafter, half turn of the second coil form 27b in the clockwise direction (FIG. 11B) and thereafter turn of it at 90 degrees in the clockwise direction (FIG. 11C) are carried out so that the start end Eb of the wire strap 25 crosses over the other of the major sides 25a of the wire strap 25.

This forms a first convolution (first layer) wound edgewise around the periphery of the second coil form 27b.

Thereafter, one and half turns of the first coil form 27a in the counter-clockwise direction and one and half turns of the second coil form 27b in the clock wise direction are respectively carried out.

As a result, successive three convolutions (partially two convolutions) of the wire strap 25 wound edgewise around the periphery of each of the first and second coil forms 27a and 27b are formed.

Figure 11E:
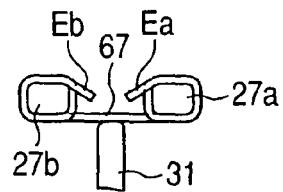

The successive three loops of the first coil form 27a proceed from the remaining center of the wire strap 25 in the opposite axial directions of the first and second coil forms 27a and 27b (see FIG. 11E).

Specifically, after completion of the one and half turns of the coil forms 27a and 27b, a pair of spaced-apart coil elements coupled to each other with a link portion 67 is generated (see FIG. 11E).

Next, the center of the link portion 67 is contacted onto the curved surface of the one end of the bending jig 31.

Figure 11F:
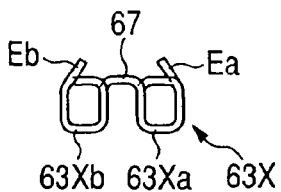

Thereafter, the pair of coil elements is folded at the contact portion of the link portion 67 with respect to the curved surface of the one end of the bending jig 31 such that:

the spaced-apart coil elements approach each other; and
the start ends Ea and Eb of the wire strap 25 are substantially symmetrical with respect to the link portion 67 (see FIG. 11F).

Removal of the pair of coil elements from the first and second coil forms 27a and 27b provides the second field coil member 63X consisting of the pair of series-connected edgewise coils 63Xa and 63Xb (see FIG. 11F).

Figure 11G:
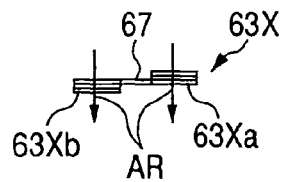

As illustrated in FIGS. 11F and 11G, the series-connected edgewise coils 63Xa and 63Xb are arranged to be symmetrical with respect to the link portion 67 thereof. Arrows AR show directions of magnetic fluxes produced by the coils 63Xa and 63Xb when a DC current is supplied from the coil end Eb of the coil 63Xb to the coil end Ea of the coil 63Xa.

In another modification of the third embodiment, each of the first and second field coil members 61 and 63 consists of a pair of series-connected edgewise coils produced with the use of the single wire strap 25, but the present invention is not limited to the structure.

Specifically, each of the first and second field coil members 61 and 63 can consist of an edgewise coil produced with the use of the single wire strap 25.

In the third embodiment, the coil end of each of the coils 61a and 61b of the first field coil member 61 has a predetermined inclined angle with respect to one longitudinal side of a corresponding one of the pole cores 15. Similarly, the coil end of each of the coils 63a and 63b of the second field coil member 63 has a predetermined inclined angle with respect to one longitudinal side of a corresponding one of the pole cores 15.

However, in the present invention, the coil end of only one of the coils 61a and 61b of the first field coil member 61 can have a predetermined inclined angle with respect to one longitudinal side of a corresponding one of the pole cores 15. Similarly, the coil end of only one of the coils 63a and 63b of the second field coil member 63 can have a predetermined inclined angle with respect to one longitudinal side of a corresponding one of the pole cores 15.

Fourth Embodiment

FIG. 12A is a circumferential developed view of the inner periphery 13a of a yoke 13 of a field coil assembly 3c according to a fourth embodiment of the present invention. Like parts between the field coil assemblies 3c and 3b, to which like reference characters are assigned, are omitted or simplified in description.

Each of a pair of first and second field coil members 61Y and 63Y of the field coil assembly 3c has a substantially identical configuration of the pair of first and second field coil members 61 and 63 of the field coil assembly 3b except for the following points:

(1) The coil end Ea of the coil 61a of the first field coil member 61Y does not have an inclined angle with respect to one longitudinal side 15c of a corresponding one of the pole cores 15.

(2) The coil end Eb of the coil 63b of the second field coil member 61Y does not have an inclined angle with respect to one longitudinal side 15c of a corresponding one of the pole cores 15.

(3) The number of turns of each of the coils 61a, 61b, 63a, and 63b is set to be substantially three and half so that successive four convolutions (partially three convolutions) of each of the coils 61a, 61b, 63a, and 63b are formed (see FIG. 12B).

(4) The coil end Ea, Eb of each of the coils 63a and 61b extending toward the first edge 13b of the yoke 13 while being tilted at the angle of θ2 from a longitudinal side 15c of the corresponding pole 15 is formed at one major side 25a1 with a rib-like reinforcing member 70 projecting therefrom. The reinforcing member 70 is designed to increase rigidity against force to be applied in the thickness direction of the coil end of each of the coils 63a and 61b orthogonal to its major sides 25a.

For example, as illustrated in FIG. 12C, the coil end Ea of the coil 63a is concavely embossed in the length direction thereof from the other major side 25a2, which faces a link portion 67a between the coils 63a and 63b, toward the one major side 25a1. This allows the one major side 25a1 of the coil end Ea to be formed with the reinforcing member 70 having a predetermined length in the length direction of the coil end Ea.

Note that, in the fourth embodiment, the coil end Ea of the coil 63a is so concavely embossed in the length direction thereof from the other major side 25a2 toward the one major side 25a1 as to leave a tip TI thereon to which the corresponding lead wire 41 is electrically connected.

In other words, while the flat tip TI is left, the reinforcing member 70 is formed on the one major side 25a1 of the coil end Ea close to the flat tip TI.

Similarly, the coil end Eb of the coil 61b is concavely embossed in the length direction thereof from the other major side 25a2, which faces a link portion 65a between the coils 61a and 61b, toward the one major side 25a1. This allows the one major side 25a1 of the coil end Eb to be formed with the reinforcing member 70 having a predetermined length in the length direction of the coil end Eb.

A production procedure of each of the first and second field coil members 61Y and 63Y is substantially identical to that of a corresponding one of the first and second field coil members 61 and 63.

Figure 13A:
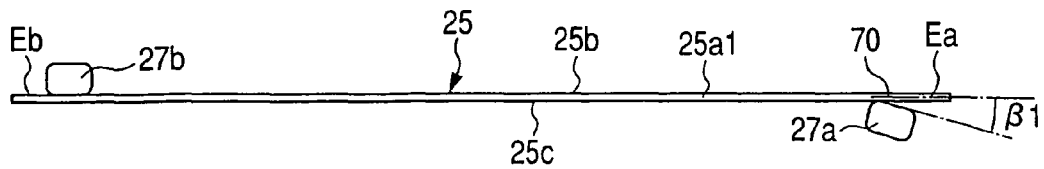
FIGS. 13A to 13F are process charts schematically illustrating a production procedure of a second field coil member of the field coil assembly illustrated in FIG. 12A.

For example, in order to produce the second field coil member 63Y, as illustrated in FIG. 13A, the reinforcing member 70 is formed on the one major side 25a1 of the coil end Ea with the tip TI being left thereon so as to have a predetermined length in the length direction of the coil end Ea.

Next, the minor side 25c of one end portion of the wire strap 25 is contacted onto one rounded corner of the periphery of one end of the first coil form 27a such that:

the coil end Ea is left; and a direction of one longitudinal side of the first coil form 27a contacting onto the minor side 25c is tilted at the angle of β1 from the minor side 25c.

The angle of β1 is substantially equivalent to the angle of θ2.

The one end portion of the wire strap 25 is clamped at, for example, the projecting reinforcing member 70 by the clamp mechanism of the first coil form 27a so that the contact state between the one end of the wire strap 25 and the one rounded corner of the first coil form 27a is maintained.

In contrast, the minor side 25b of the other end of the wire strap 25 is so contacted onto one longitudinal side of the periphery of one end of the second coil form 27b as to leave the predetermined lengthened end Eb thereof. The minor side 25b of the other end portion of the wire strap 25 is clamped by the clamp mechanism of the second coil form 27b.

Figure 13B:
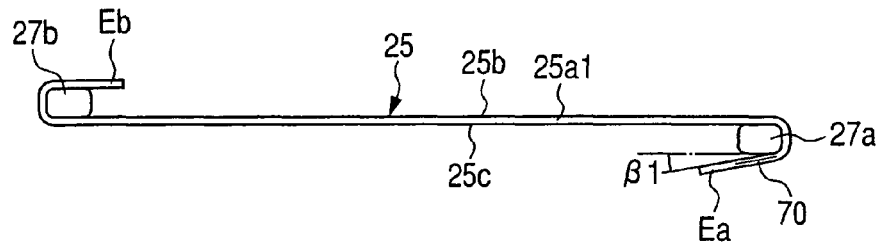
Figure 13C:
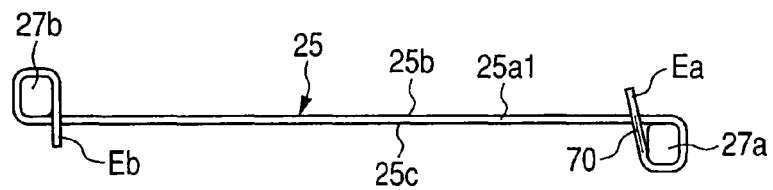
Figure 13D:
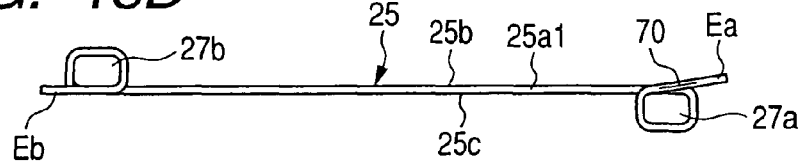

Thereafter, substantially three and half turns of the coil forms 27a and 27b in the clockwise direction are carried out (FIGS. 13B to 13D corresponding to FIGS. 5B to 5E at the one end side and to FIGS. 3B to 3E at the other end side).

Figure 13E:
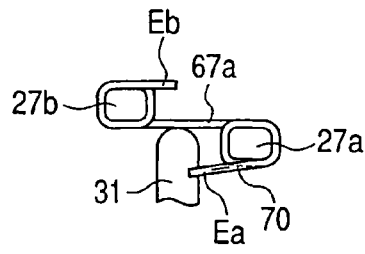

After completion of the substantially three and half turns of the coil forms 27a and 27b, a pair of spaced-apart coil elements coupled to each other with a link portion 67 is generated (see FIG. 13E).

Next, the center of the link portion 67a is contacted onto the curved surface of the one end of the bending jig 31.

Figure 13F:
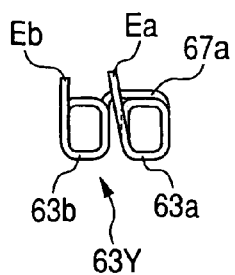

Thereafter, the pair of coil elements is folded at the contact portion of the link portion 67a with respect to the curved surface of the one end of the bending jig 31 such that:

the spaced-apart coil elements approach each other;

the start ends Ea and Eb of the wire strap 25 are substantially opposite to each other; and an end of the last convolution of the coil element corresponding to the first coil form 27a and the link portion 33 continuing therefrom are pressed away from the convolutions of the coil element corresponding to the first coil form 27a (see FIG. 13F).

Removal of the pair of coil elements from the first and second coil forms 27a and 27b provides the second field coil member 63Y consisting of the pair of series-connected edgewise coils 63a and 63b (see FIG. 13F).

As described above, in the fourth embodiment, the coil end Ea, Eb of each of the coils 63a and 61b extending toward the first edge 13b of the yoke 13 to be electrically connected to the corresponding one of the lead wires 41 is formed at one major side 25a1 with the reinforcing member 70 projecting therefrom.

For example, because the reinforcing member 70 is configured to convexly project from the one major side 25a1 of the coil end, it is possible to increase the section modulus of the coil end against force to be applied in the thickness direction thereof. This enables the coil end of each of the coils 63a and 61b to have high rigidity. This prevents the coil end of each of the coils 63a and 61b from largely vibrating even if large amount of vibration acceleration transfers the coil end thereof, thus further preventing the lead wire 41 connected to the coil end of each of the coils 63a and 61b from largely vibrating.

This makes it possible to improve the vibration resistance of the coil end of each of the coils 63a and 61b and to prevent the lead wires 41 from deteriorating, such as breaking, due to the transfer of the vibration acceleration to the coil end thereof.

In addition, in the fourth embodiment, the reinforcing member 70 is formed on the one major side 25a1 of the one end portion of the wire strap 25 before the wire strap 25 is wound around the periphery of the coil form 27a.

Therefore, as set forth above, it is possible for the clamp mechanism to easily clamp the one end portion of the wire strap 25 with the use of the reinforcing member 70. This can prevent deformation of a portion of the wire strap 25 to be clamped from deforming, which allows the tension applied to the wire strap 25 to be substantially kept constant. This makes it possible to prevent each of the first and second coil members 61Y and 63Y from being disarrayed.

The reinforcing member 70 is formed on the one major side 25a1 of the coil end of each of the coils 63a and 61b extending outwardly from the convolutions thereof. For this reason, when the wire strap 25 is wound around the periphery of each of the first and second coil forms 27a and 27b, the wire strap 25 can be prevented from being interfering with the previously formed reinforcing member 70. For the same reason, the convolutions of each of the coils 61a, 61b, 63a, and 63b can be prevented from being disarrayed.

Fifth Embodiment

Figure 14A:
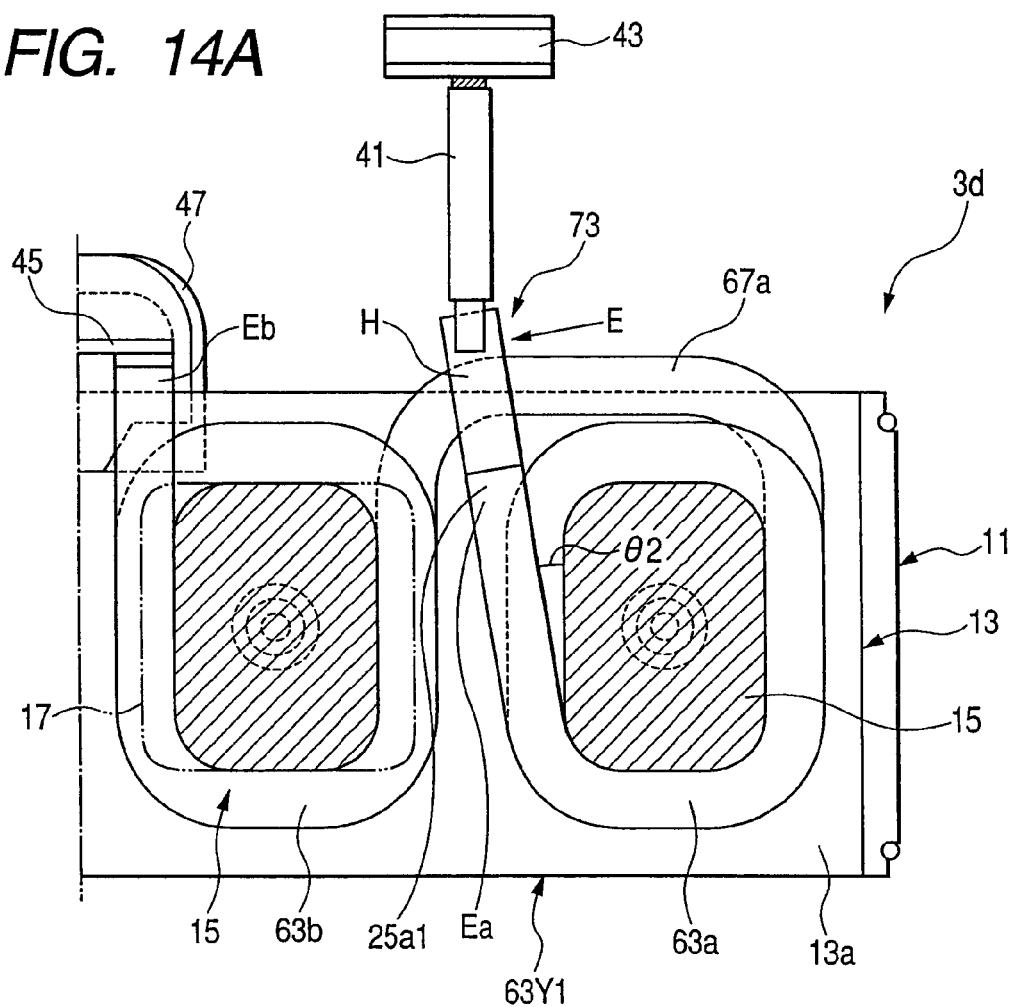
FIG. 14A is a partially sectional circumferential developed view of part of the inner periphery of a yoke of a field coil assembly according to a fifth embodiment of the present invention.

FIG. 14A is a circumferential developed view of part of the inner periphery 13a of a yoke 13 of a field coil assembly 3d according to a fifth embodiment of the present invention. Like parts between the field coil assemblies 3d and 3c, to which like reference characters are assigned, are omitted or simplified in description.

A second field coil member 63Y1 of the field coil assembly 3d has a substantially identical configuration of the second field coil member 63Y of the field coil assembly 3c except for the following point:

In place of the reinforcing member 70, the coil end Ea of the coil 63a extending toward the first edge 13b of the yoke 13 and projecting therefrom is formed with a folded portion 73 to provide a double thickness thereof. To the folded portion 73, the corresponding lead wire 41 is electrically connected.

Figure 14B:
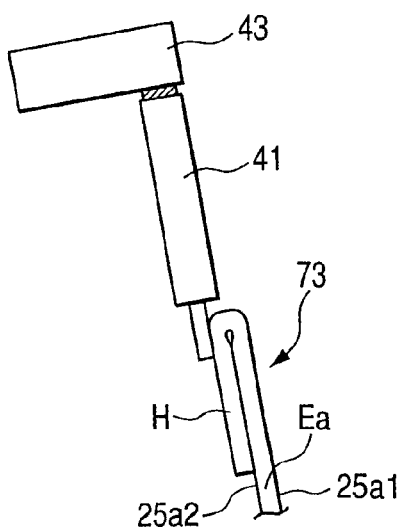
FIG. 14B is a view of part of the field coil assembly as viewed from arrow E of FIG. 14A.

Specifically, as illustrated in FIG. 14B, a head H of the coil end Ea of the coil 63a is folded about a line on the other major side 25a2 along its width thereof such that the other major side 25a2 of the head H abuts on that of the coil end Ea adjacent to the head H thereof. This allows the folded portion 73 with the double thickness of the coil end Ea to be formed. The corresponding lead wire 41 is electrically connected to the one major side 25a1 of the head H of the coil end Ea.

As described above, in the fifth embodiment, the folded portion 73 of the coil end Ea of the coil 63a is increased in thickness between the major sides 25a1 and 25a2. The increase in the thickness of the folded portion 73 increases the section modulus of the folded portion 73 of the coil end Ea against force to be applied in the thickness direction thereof.

This enables the folded coil end 73 of the coil 63a to have high rigidity. This prevents the folded coil end 73 of the coil 63a from largely vibrating even if large amount of vibration acceleration transfers the coil end Ea thereof, thus further preventing the lead wire 41 connected to the folded coil end 73 of the coil 63a from largely vibrating.

This makes it possible to improve the vibration resistance of the folded coil end 73 of the coil 63a and to prevent the corresponding lead wire 41 from deteriorating, such as breaking, due to the transfer of the vibration acceleration to the coil end Ea thereof.

In addition, in the fifth embodiment, the increase in the thickness of the folded coil end 73 of the coil 63a can prevent deformation of a portion of the wire strap 25 to be clamped from deforming, which allows the tension applied to the wire strap 25 to be substantially kept constant. This makes it possible to prevent the second coil member from being disarrayed.

The coil end Eb of the coil 61b extending toward the first edge 13b of the yoke 13 and projecting therefrom can be formed with a folded portion 73 to provide a double thickness thereof, which can obtain the effects set forth above.

Sixth Embodiment

Figure 15A:
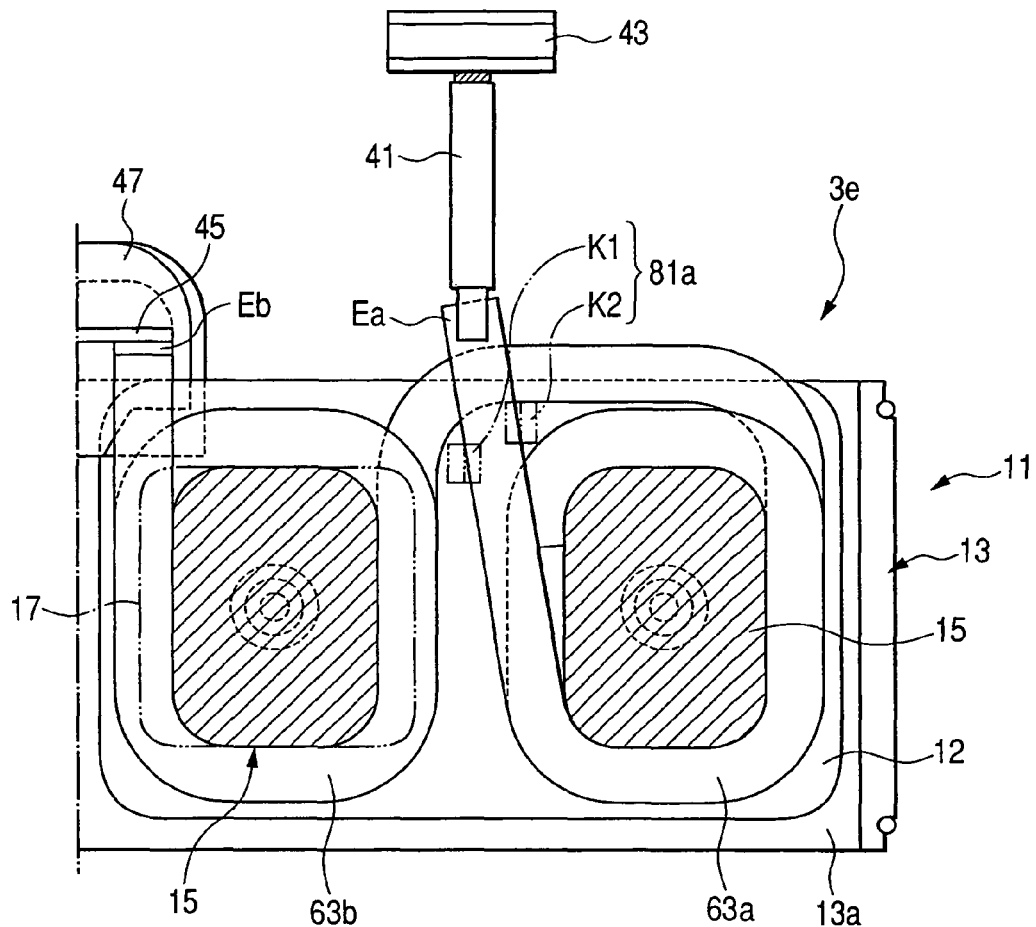
FIG. 15A is a partially cross-sectional circumferential developed view of part of the inner periphery of a yoke of a field coil assembly according to a sixth embodiment of the present invention.

FIG. 15A is a circumferential developed view of part of the inner periphery 13a of a yoke 13 of a field coil assembly 3e according to a sixth embodiment of the present invention. Like parts between the field coil assemblies 3e and 3c, to which like reference characters are assigned, are omitted or simplified in description.

In the sixth embodiment, no reinforcing member is formed on the coil end Ea of the coil 63a extending toward the first edge 13b of the yoke 13 and projecting therefrom.

In the sixth embodiment, the field coil assembly 3e has a specific structure as compared with the field coil assembly 3c.

Specifically, the field coil assembly 3e is provided with a plastic bobbin 81 arranged between the second coil member 63 and the yoke assembly 11 and operative to support the second coil member 63 while isolating it from the yoke assembly 11.

The bobbin 81 is composed of a coil supporting member 81a, a pair of rectangular cylindrical portions 81b, a first flange 81c, a second flange 81d, and a link portion 81e.

Figure 15B:
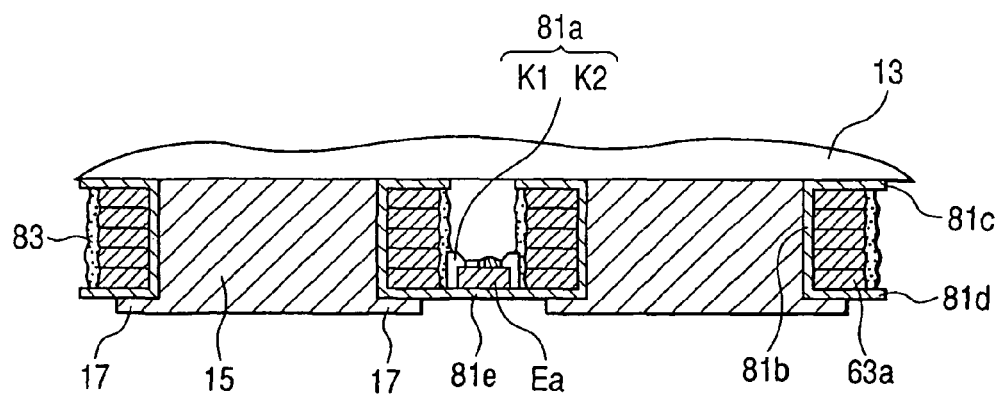
FIG. 15B is an axially cross-sectional view of part of the field coil assembly illustrated in FIG. 15A.

As illustrated in FIG. 15B, the paired rectangular cylindrical portions 81b are respectively fitted on the peripheries of the pole cores 15 for the coils 63a and 63b of the second coil member 63.

The first flange 81c outwardly extends from one rectangular cylindrical edge of each of the cylindrical portions 81b in a circumferential direction of the yoke 13; this one rectangular cylindrical edge abuts on the inner periphery 13a of the yoke 13.

The second flange 81d outwardly extends from the other rectangular cylindrical edge of each of the cylindrical portions 81b in a circumferential direction of the yoke 13; this other rectangular cylindrical edge abuts on the flange 17 of the corresponding pole core 15.

One circumferential end of one of the circumferentially adjacent second flanges 81d and one circumferential end of the other of the circumferentially adjacent second flanges 81d, which are opposite to each other, are linked to each other, this link portion serves as the link portion 81e.

The coil supporting member 81a is mounted on an inner surface of the link portion 81e opposite to the inner periphery 13a of the yoke 13.

As illustrated in FIG. 15B, the coil supporting member 81*a* consists of a pair of hooks K1 and K2 designed to fasten the coil end Ea of the coil 63*a* extending toward the first edge 13*b* of the yoke 13.

The coils 63*a* and 63*b* are wholly covered with an adhesive member 83, such as thermoset powder resins or liquid adhesive, and thereafter, they are fixedly fitted on the outer peripheries of the corresponding cylindrical portions 81*b* of the bobbin 81 by the adhesive member 83, respectively.

With the structure of the field coil assembly 3*e* according to the sixth embodiment, the coil end Ea of the coil 63*a* is fixedly supported by the coil supporting member 81*a* and fixedly supported on the bobbin 81 by the adhesive member 83.

This can improve the vibration resistance of the coil end Ea of the coil 63*a*, and prevent the corresponding lead wire 41 from deteriorating, such as breaking, due to the transfer of the vibration acceleration to the coil end Ea thereof.

In addition, the whole of the second field coil member 63 is covered with the adhesive member 83 to be fixed on the bobbin 81. This can reduce micro-vibrations caused between axially adjacent layers of each of the coils 63*a* and 63*b*, making it possible to improve the second field coil member 63 (the field coil assembly 3*e*).

The plastic bobbin 81 can be arranged between the first coil member 61 and the yoke assembly 11 and operative to support the first coil member 63 while isolating it from the yoke assembly 11, and the whole of the second field coil member 63 can be covered with the adhesive member 83 to be fixed on the bobbin 81. This can obtain the same effects according to the sixth embodiment set forth above.

In addition to the reinforcing member 70, the coil end Ea of the coil 63*a* extending toward the first edge 13*b* of the yoke 13 and projecting therefrom can be formed with the folded portion 73 to provide a double thickness thereof.

Seventh Embodiment

Figure 16A:
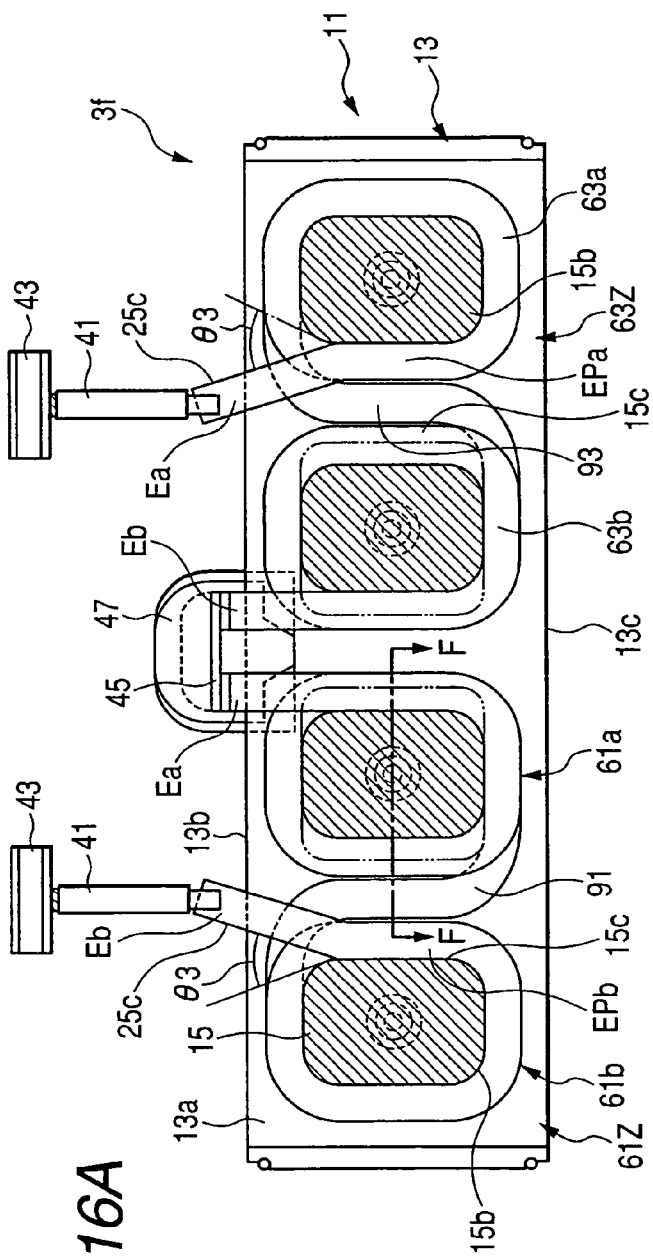
FIG. 16A is a partially sectional circumferential developed view of part of the inner periphery of a yoke of a field coil assembly according to a seventh embodiment of the present invention.

FIG. 16A is a circumferential developed view of the inner periphery 13*a* of a yoke 13 of a field coil assembly 3*f* according to a seventh embodiment of the present invention. Like parts between the field coil assemblies 3*f* and 3*b*, to which like reference characters are assigned, are omitted or simplified in description.

Each of a pair of first and second field coil members 61Z and 63Z of the field coil assembly 3*f* has a substantially identical configuration of the pair of first and second field coil members 61 and 63 of the field coil assembly 3*b* except for the following points:

(1) The coil end Ea of the coil 61*a* of the first field coil member 61Z does not have an inclined angle with respect to one longitudinal side 15*c* of a corresponding one of the pole cores 15.

(2) The coil end Eb of the coil 63*b* of the second field coil member 61Z does not have an inclined angle with respect to one longitudinal side 15*c* of a corresponding one of the pole cores 15.

(3) The coil end Ea of the end portion EPa of the innermost convolution of the coil 63*a* extends outwardly toward the first edge 13*b* of the yoke 13 from a starting point on one rounded upper corner 15*a* of the corresponding pole core 15 such that the minor side 25*c* thereof is tilted at an angle of θ3 from a tangential direction at the starting point of the one rounded upper corner 15*a*.

(4) The coil end Eb of the end portion EPb of the innermost convolution of the coil 61*b* extends outwardly toward the first edge 13*b* of the yoke 13 from a starting point on one rounded upper corner 15*a* of the corresponding pole core 15 such that the minor side 25*c* thereof is tilted at the angle of θ3 from a tangential direction at the starting point of the one rounded upper corner 15*a*.

Figure 16D:
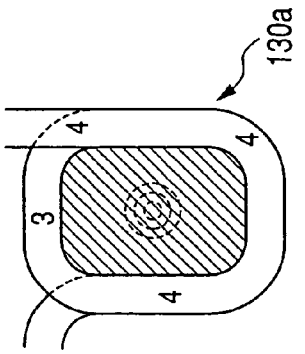
FIG. 16D is a view schematically illustrating the number of turns of a coil of a first field coil member electrically connected to a lead plate illustrated in FIG. 20.
Figure 16C:
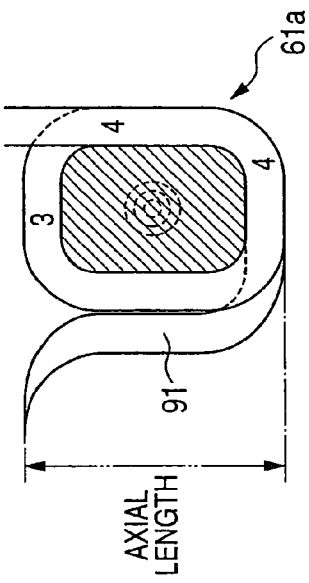
FIG. 16C is a view schematically illustrating the number of turns of a coil of a first field coil member electrically connected to a lead plate illustrated in FIG. 16A.
Figure 16B:
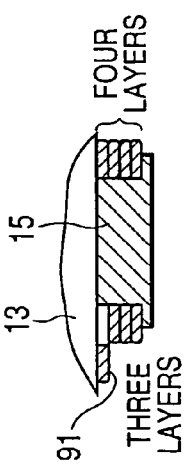
FIG. 16B is a cross sectional view of the field coil assembly take on line F-F of FIG. 16A.
Figure 18A:
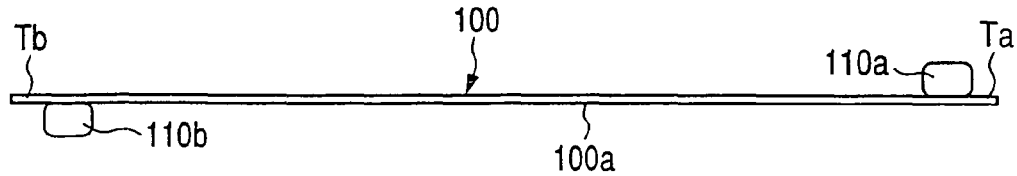
FIGS. 18A to 18F are process charts schematically illustrating a production procedure of a conventional first field coil member of a field coil assembly.
Figure 18B:
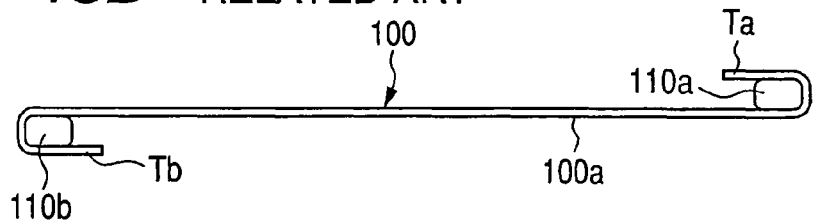
Figure 18C:
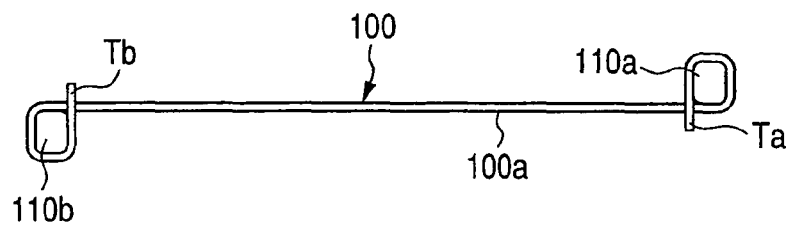
Figure 18D:
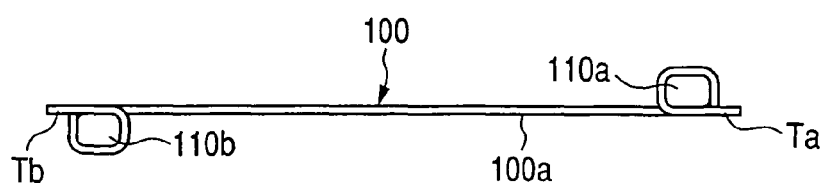
Figure 18E:
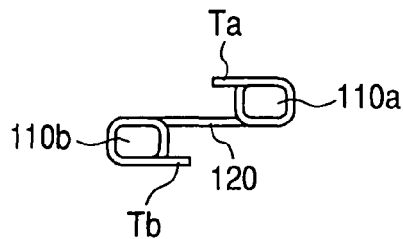
Figure 18F:
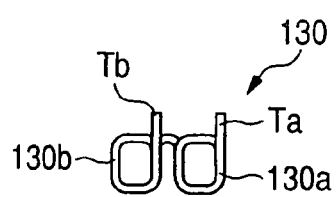
Figure 19A:
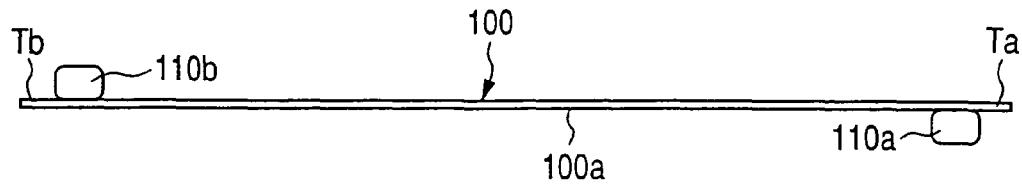
FIGS. 19A to 19F are process charts schematically illustrating a production procedure of a conventional second field coil member of the field coil assembly.
Figure 19B:
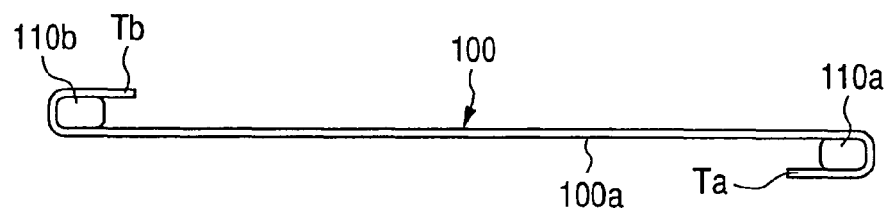
Figure 19C:
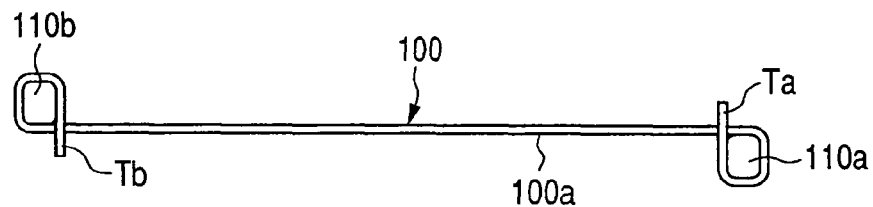
Figure 19D:
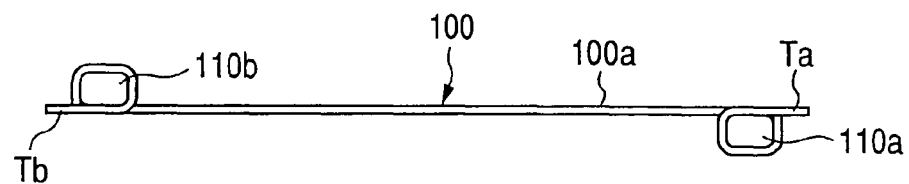
Figure 19E:
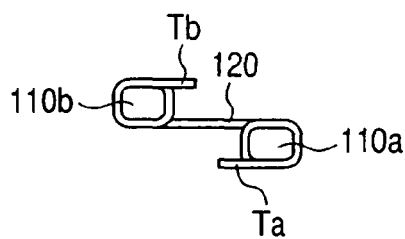
Figure 19F:
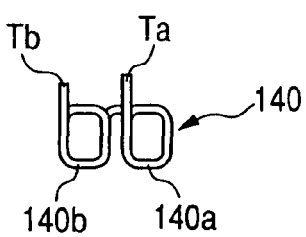

(5) The number of turns of each of the coils 61*a*, 61*b*, 63*a*, and 63*b* is set to be substantially three and half so that successive four convolutions (partially three convolutions) of each of the coils 61*a*, 61*b*, 63*a*, and 63*b* are formed (see FIG. 16B).

(6) As illustrated in FIG. 16A, a link portion 91 continuing from the outermost convolution of the coil 61*a* extends upwardly from one rounded lower corner portion 15*b*, which is circumferentially adjacent to the coil 61*b*, of the pole core 15 corresponding to the coil 61*a*, and continues to the outermost convolution of the coil 61*b* at one rounded upper corner portion 15*a*, which is circumferentially adjacent to the coil 61*a*, of the pole core 15 corresponding to the coil 61*b*.

During a production procedure of the field coil assembly 3*f*, the arrangement of the link portion 91 can be carried out in the folding process (see FIG. 16F).

As clearly seen in comparison between FIG. 16C and FIG. 16D, the number of turns of the coil 61*a* is lower by substantially half turn than that of turns of the coil 130*a* illustrated in FIG. 20. Note that, in FIGS. 16C and 16D, numerical characters marked on the coils 61*a* and 130*a* represent the number of turns (convolutions) thereof.

Specifically, as illustrated in FIG. 20, the link portion 120 continuing from the outermost convolution of the coil 130*a* extends circumferentially from one rounded upper corner portion 15*a*, which is circumferentially adjacent to the coil 130*b*, of the pole core 15 corresponding to the coil 130*a*, and continues to the outermost convolution of the coil 130*b* at one rounded upper corner portion 15*a*, which is circumferentially adjacent to the coil 130*a*, of the pole core 15 corresponding to the coil 130*b*.

Thus, as illustrated in FIGS. 16D and 20, the number of turns (layers) of coil 130*a* along both longitudinal sides 15*c* of the corresponding pole core 15 is defined to be 4.

In contrast, as illustrated in FIGS. 16A and 16C, the number of turns (layers) of coil 61*a* along one longitudinal side 15*c* of the corresponding pole core 15 close to the link portion 91 is defined to be 3 lower by 1 than that of turns (layers) of coil 61*a* along the other longitudinal side 15*c* thereof.

This allows the number of turns of the coil 61*a* to be lower than that of turns of the coil 130*a* by substantially half (0.5) turn.

As well as the link portion 91, the link portion 93 continuing from the outermost convolution of the coil 63*b* extends upwardly from one rounded lower corner portion 15*b*, which is circumferentially adjacent to the coil 63*a*, of the pole core 15 corresponding to the coil 63*b*, and continues to the outermost convolution of the coil 63*a* at one rounded upper corner portion 15*a*, which is circumferentially adjacent to the coil 63*b*, of the pole core 15 corresponding to the coil 63*a*.

Thus, for the same reasons as the first field coil member 61Z, the configuration of the link portion 93 allows the number of turns of the coil 63*b* to be lower than that of turns of the coil 140*b* by substantially half (0.5) turn.

Because the field coil assembly 3*f* consists of the first and second field coil members 61Z and 63Z, it is possible to adjust the number of turns of the field coil assembly 3*f* within one turn.

As a modification of the field coil assembly 3*f*, as illustrated in FIG. 17A, a link portion 91A continuing from the outermost convolution of the coil 61*a* extends circumferentially from a middle portion of one longitudinal side 15*c*, which is circumferentially adjacent to the coil 61*b*, of the pole core 15 corresponding to the coil 61*a*, and continues to the outermost convolution of the coil 61*b* at a middle portion of one longitudinal side 15*c*, which is circumferentially adjacent to the coil 61*a*, of the pole core 15 corresponding to the coil 61*b*.

As clearly seen in comparison between FIG. 17C and FIG. 17D, the number of turns of the coil 61*a* is lower by substantially quarter half turn than that of turns of the coil 61*b*. Note that, in FIGS. 17C and 17D, numerical characters marked on the coils 61*a* and 61*b* represent the number of turns (convolutions) thereof.

As described above, in the seventh embodiment and its modification, change of either the circumferential position or the axial direction of the link portion 91, 91A extending from the coils 61*a* and 61*b* allows the number of turns of either the edgewise coil 61*a* or 61*b* to be adjusted.

In other words, change of the axial length of the link portion 91, 91A axially arranged to continue between the coils 61*a* and 61*b* allows the number of turns of either the edgewise coil 61*a* or 61*b* to be adjusted.

This makes it possible to adjust a magnetic flux to be produced in the axial direction of either the edgewise coil 61*a* or 61*b*, thus controlling the output torque of the starter motor 1.

In the first to fifth embodiments and the seventh embodiment, an electrically insulating bobbin can be arranged between at least one of the first and second coil members and the yoke assembly 11. In this case, the coil supporting member 81*a* described in the sixth embodiment can be provided for fastening the coil end of at least one coil of the least one of the first and second coil members.

In the first to seventh embodiments, the present invention is applied to starter motors for vehicles, but the present invention is not limited to the applications. Specifically, the present invention can be applied to other types of rotary electric machines for energizing a field coil to produce a magnetic flux therein.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A rotary electric machine for rotating an armature based on a magnetic field, the rotary electric machine comprising:
    a yoke having a circumferential surface and first and second pole cores mounted on the circumferential surface, each of the first and second pole cores having an outer periphery;
    a field coil member working to produce a magnetic field when energized, the field coil member being composed of a rectangular wire strap, the rectangular wire strap having a pair of opposing major sides and a thickness therebetween substantially less than a width of the major sides, the rectangular wire strap being wound edgewise into the field coil member, the field coil member comprising:
    a first edgewise coil composed of a plurality of coaxially layered convolutions, the plurality of coaxially layered convolutions being wound around the outer periphery of the first pole core;
    a second edgewise coil composed of a plurality of coaxially layered convolutions, the plurality of coaxially layered convolutions being wound around the outer periphery of the second pole core; and
    a link portion connecting between the first edgewise coil and the second edgewise coil in series,
    one of the first and second edgewise coils having one coil end extending therefrom to cross over the link portion at a crossover portion thereof, the crossover portion between the one coil end and the link portion being arranged to be non-overlapped with the plurality of convolutions of the one of the first and second edgewise coils.

2. A rotary electric machine according to claim 1, wherein the one of the first and second edgewise coils is provided with a predetermined circumferential region between the one coil end and the link portion, the number of layered convolutions at the predetermined circumferential region being lower than that of layered convolutions of another circumferential region of the one of the first and second edgewise coils, the plurality of coaxially layered convolutions of the one of the first and second edgewise coils being stepped by one layer at the predetermined circumferential region toward the inner circumferential surface of the yoke.

* * * * *